(12) United States Patent
Nordick et al.

(10) Patent No.: US 9,736,032 B2
(45) Date of Patent: Aug. 15, 2017

(54) PATTERN-BASED VALIDATION, CONSTRAINT AND GENERATION OF HIERARCHICAL METADATA

(71) Applicant: Microsoft Technology Licensing, LLC, Redmond, WA (US)

(72) Inventors: Michael R. Nordick, Horace, ND (US); Christopher R. Garty, Fargo, ND (US); Adrian L. Orth, West Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 14/507,385

(22) Filed: Oct. 6, 2014

(65) Prior Publication Data
US 2015/0350030 A1   Dec. 3, 2015

Related U.S. Application Data

(60) Provisional application No. 62/005,546, filed on May 30, 2014.

(51) Int. Cl.
*G06F 3/048* (2013.01)
*H04L 12/24* (2006.01)
*G06F 3/0484* (2013.01)
*G06F 3/0482* (2013.01)

(52) U.S. Cl.
CPC ............ *H04L 41/22* (2013.01); *G06F 3/0482* (2013.01); *G06F 3/04842* (2013.01)

(58) Field of Classification Search
CPC .............. G06F 3/0482; G06F 3/0481; G06F 17/30961; G06F 3/04815; G06F 17/243; G06F 17/2247; G06F 17/211; G06F 17/2725; G06F 7/00
See application file for complete search history.

(56) References Cited

U.S. PATENT DOCUMENTS

| | | | |
|---|---|---|---|
| 7,475,333 B2 | 1/2009 | Otter et al. | |
| 7,665,014 B2 | 2/2010 | Kristiansen et al. | |
| 8,055,996 B2 | 11/2011 | Carrier | |
| 8,380,742 B2 | 2/2013 | Kiziltunc et al. | |
| 2003/0078949 A1 | 4/2003 | Scholz et al. | |
| 2004/0153992 A1* | 8/2004 | Molina-Moreno | G06F 8/35 717/105 |
| 2007/0011177 A1 | 1/2007 | Sol et al. | |
| 2008/0134135 A1 | 6/2008 | Elaasar | |

(Continued)

OTHER PUBLICATIONS

Jonesb, et al., "A Metadata-driven Framework for Generating Field Data Entry Interfaces in Ecology", In Proceedings of Ecological Informatics, vol. 2, No. 3, Oct. 2007, pp. 270-278.

(Continued)

*Primary Examiner* — Tadeese Hailu
(74) *Attorney, Agent, or Firm* — Christopher J. Volkmann; Kelly, Holt & Christenson, PLLC

(57) ABSTRACT

A set of metadata defines a hierarchical structure. The metadata is compared against a pattern or sub pattern for the hierarchical structure. Comparison results are generated that show differences between a core structure defined by the pattern and a core structure in the hierarchical data, as well as content defined by a sub pattern, and content in the hierarchical structure.

19 Claims, 21 Drawing Sheets

(56) References Cited

U.S. PATENT DOCUMENTS

| | | | |
|---|---|---|---|
| 2009/0132995 A1* | 5/2009 | Iborra | G06F 8/30 717/106 |
| 2010/0174687 A1 | 7/2010 | Krishnaswamy et al. | |
| 2011/0035655 A1* | 2/2011 | Heineken | G06F 17/211 715/223 |
| 2012/0143867 A1* | 6/2012 | Roy | G06F 17/30943 707/737 |
| 2012/0143923 A1* | 6/2012 | Whitney | G06F 17/30997 707/803 |
| 2013/0268834 A1* | 10/2013 | Krane | G06Q 10/06 715/222 |
| 2014/0165136 A1* | 6/2014 | Ozawa | H04L 63/205 726/1 |
| 2015/0006878 A1* | 1/2015 | Kumar | G06F 8/355 713/100 |
| 2015/0113500 A1* | 4/2015 | Badawy | G06F 8/20 717/105 |
| 2015/0269194 A1* | 9/2015 | King | G06F 11/00 707/805 |

OTHER PUBLICATIONS

Jauf, et al., "Creating Forms in SAP ERP HCM", In Galileo Press. May 28, 2009, 33 pages.
"Form Overview [AX 2012]", Published on: Nov. 29, 2011 Available at: http://msdn.microsoft.com/en-us/library/aa844397.aspx.

* cited by examiner

PATTERN-BASED VALIDATION, CONSTRAINT AND GENERATION OF HIERARCHICAL METADATA

CROSS-REFERENCE TO RELATED APPLICATION

The present application is based on and claims the benefit of U.S. provisional patent application Ser. No. 62/005,546, filed May 30, 2014, the content of which is hereby incorporated by reference in its entirety.

BACKGROUND

Computer systems are currently in wide use. Some such computer systems are relatively large, and can include hundreds, or even thousands of different user interface display screens.

Some such computer systems include enterprise resource planning (ERP) systems, customer relations management (CRM) systems, line-of-business (LOB) systems, electronic mail and other messaging systems, document management systems, among others. As an example, business systems (such as ERP, CRM or LOB systems), can include thousands of different forms. Each form can have its own set of user interface display elements It is also relatively common for such systems to be periodically or intermittently updated or revised. In some current systems, however, each form basically corresponds to a unique entity and the properties relating to the user experience are modeled independently, on each different form. Also, some form patterns support multiple entities and show summary information across the entity types. The properties can be spread across a wide variety of different controls on a form. Therefore, and because of the large number of forms, it can be difficult to maintain a consistent user experience across all of the different forms, and across updates and revisions to the underlying system.

Some systems have used a checking mechanism. The checking mechanism can be used by a developer, after the developer has generated a form, to determine whether the form conforms to an overall structure expected for that type of form. However, these types of systems have certain drawbacks. For instance, they are run by the developer, after the developer has already created the form. This means that, by its nature, such a mechanism is optional and may not always be run by the developer. In addition, simply because the overall structure of a given form conforms to an expected structure or pattern, that does not mean that the deeper content, inside the form (such as where the developer places his or her own content), also conforms to an expected pattern. This can result in a user experience that diverges greatly, from one form to the next.

The discussion above is merely provided for general background information and is not intended to be used as an aid in determining the scope of the claimed subject matter.

SUMMARY

A set of metadata defines a hierarchical structure. The metadata is compared against a pattern or sub pattern for the hierarchical structure. Comparison results are generated that show differences between a core structure defined by the pattern and a core structure in the hierarchical data, as well as dependent content or structure defined by a sub pattern, and dependent content in the hierarchical structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
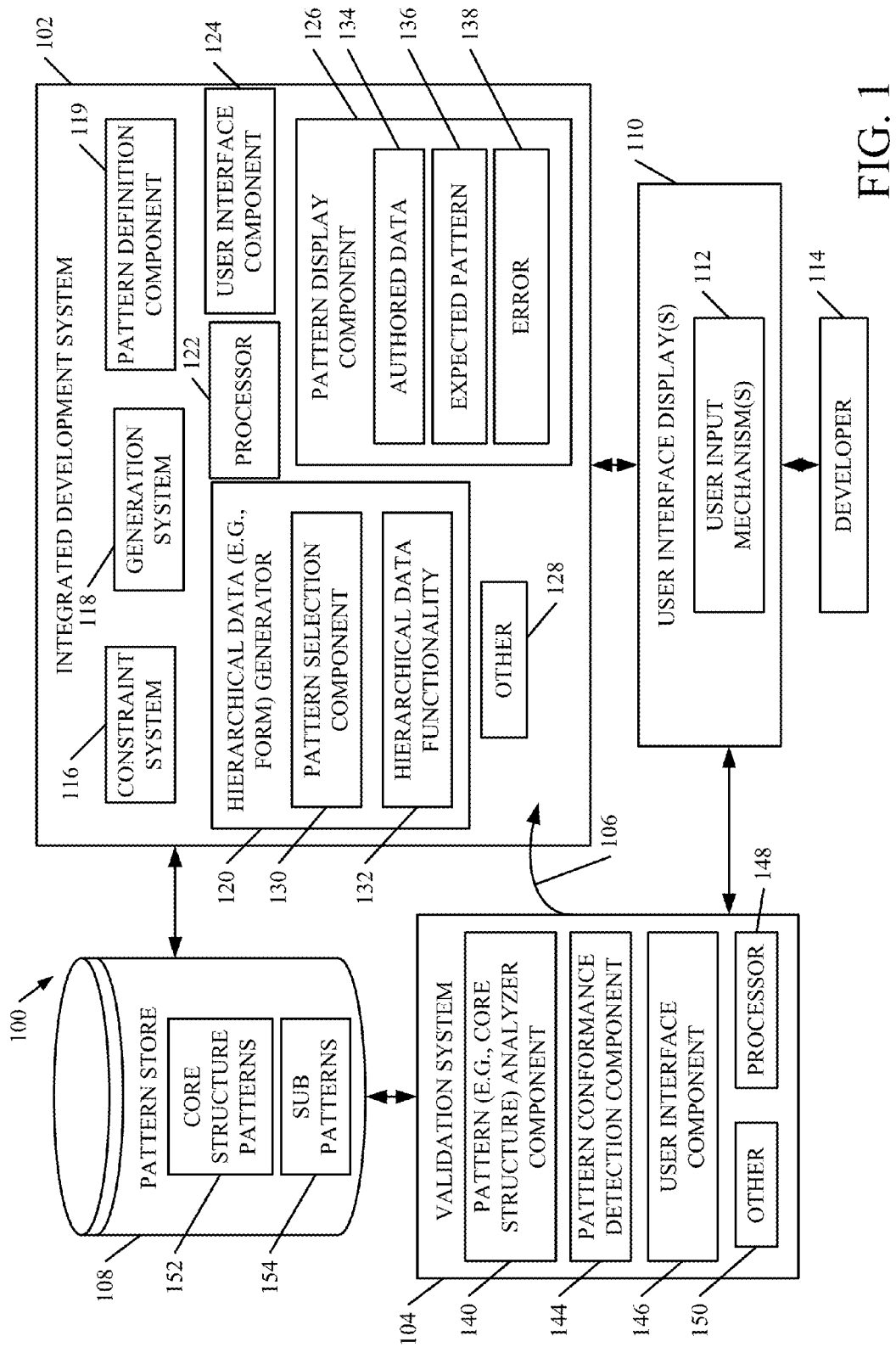
FIG. 1 is a block diagram of one pattern-based checking architecture.

FIG. 1 is a block diagram of one example of a pattern-based checking architecture 100. Architecture 100 illustratively includes integrated development system 102, validation system 104 (which can be part of integrated development system 102 or separate therefrom, as indicated by arrow 106) and pattern store 108. In one embodiment, user interface displays 110 are generated with user input mechanisms 112, for interaction by developer 114. Developer 114 illustratively interacts with user input mechanisms 112 in order to control and manipulate integrated development system 102 and validation system 104. In one embodiment, developer 114 can do this in order to create patterns and sub patterns for hierarchical data, in order to help in creating hierarchical structures, and in order to develop and validate those hierarchical data structures using the patterns.

Integrated development system 102, in one embodiment, illustratively includes constraint system 116, generation system 118, pattern definition component 119, hierarchical data (e.g., form) generator 120, processor 122, user interface component 124, pattern display component 126, and it can include other items 128 as well. Hierarchical data generator 120 illustratively includes pattern selection component 130 and hierarchical data authoring functionality 132. Pattern display component 126 is illustratively used to display authored patterns 134, expected patterns 136 and errors 138 which may represent differences between the authored patterns 134 and the expected patterns 136.

Validation system 104 illustratively includes pattern analyzer component 140, pattern performance detection component 144, user interface component 146, processor 148, and it can include other items 150 as well. In one example, system 104 can include its own user interface component 146 as well, or it can be accessed in other ways, such as through a command line tool.

Pattern store 108 illustratively includes core structure patterns 152, as well as sub patterns 154. Before describing the overall operation of architecture 100 in more detail, a brief overview will be provided.

Developer 114 can illustratively use hierarchical data generator 120 to generate hierarchical data, such as data that defines a form within a business system or another system. Hierarchical data authoring functionality 132 allows the user to input the hierarchical data. Pattern selection component 130 allows developer 114 to select a pattern or sub pattern to use in authoring the hierarchical data, as developer 114 is authoring it. Constraint system 116 constrains the user input mechanisms available to developer 114, so that developer 114 is only able to author the hierarchical data in conformance with the selected pattern (or sub pattern). Generation system 118 operates in conjunction with constraint system 116 to automatically generate the overall structure, and substructures, associated with a selected pattern and sub patterns. Pattern display component 126 displays the authored pattern 134 that developer 114 is authoring, along with the expected pattern 136 (including sub patterns), and it can include any errors 138. Errors 138 can represent the difference between the authored pattern 134 and expected pattern 136.

Validation system 104 can be used to validate previously-authored hierarchical data structures. For instance, if developer 114 has already authored a form, and wishes to have that form analyzed against expected patterns, developer 114 can use validation system 104. In another embodiment, validation system 104 is part of integrated development system 102. Therefore, it can be run continuously, or intermittently, as developer 114 is authoring a form. For instance, it can be run when developer 114 saves or compiles the authored form, or both, as the developer 114 is authoring the form. When integrated with compilation, it can be used to prevent the compilation from succeeding unless the pattern or sub pattern has been satisfied. This helps to increase the likelihood that the form meets the requirements of the pattern or sub pattern.

When it is run, pattern analyzer component 140 analyzes the overall structure of the hierarchical data authored by developer 114. For instance, where that data represents a form, component 140 analyzes the overall structure of the metadata defining the form. Analyzer component 140 also analyzes added data, structure and content, which is added by developer 114 (such as controls, containers, etc.) to determine whether they conform to sub patterns for those items. Pattern conformance detection component 144 determines whether the authored hierarchical data conforms to the patterns and sub patterns and identifies differences. User interface component 146, either on its own or under the control of another item, generates a user interface display. For example, when validation system 104 is part of integrated development system 102, user interface component 146 can be controlled by pattern display component 126 to display not only the authored data 134 that is currently being authored by developer 114, but the expected pattern 136, and any errors in the authored data 134. Developer 114 can then quickly determine where the authored data does not conform to the expected patterns or sub patterns, and can take remedial action, in order to bring the authored data into conformance with the selected patterns and sub patterns, if desired.

Figure 2:
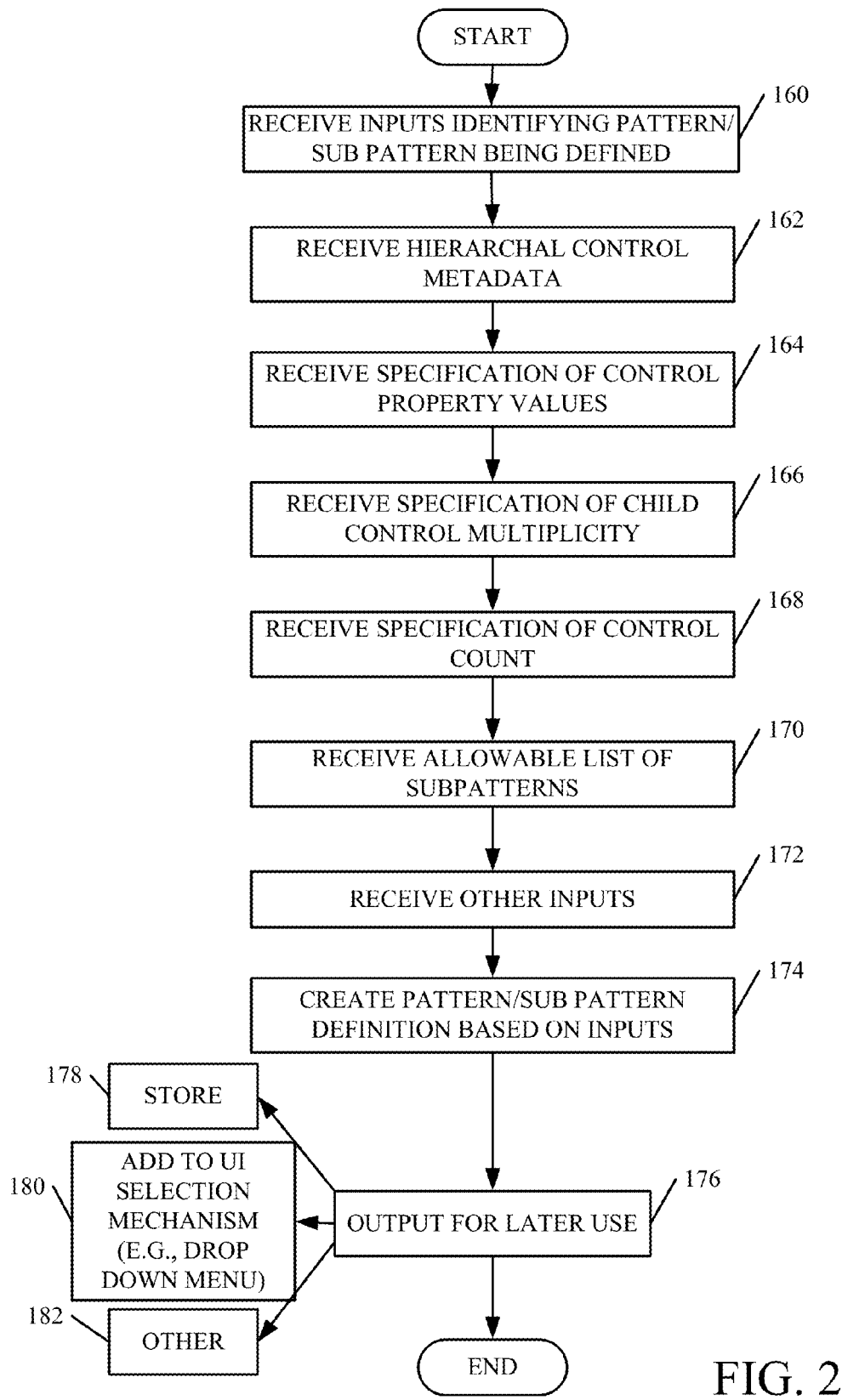
FIG. 2 is a flow diagram illustrating one embodiment of the operation of architecture 100 in defining patterns.

FIG. 2 is a flow diagram illustrating one embodiment of the operation of pattern definition component 119 in allowing developer 114 (or another party) to define patterns that can be used in architecture 100. Pattern definition component 119 first generates user interface displays that allow developer 114 to input identity information identifying patterns and sub patterns being defined. This is indicated by block 160 in FIG. 2. Component 119 then generates user interface displays that allow developer 114 to specify a number of different things for the pattern or sub pattern being defined. The developer can specify hierarchical control metadata that allows the developer to specify the structure as being hierarchical in nature. This is indicated by block 162. Developer 114 can specify control property values, as well as child control multiplicity. This is indicated by blocks 164 and 166 in FIG. 2. Developer 114 can also specify control count, as well as a list of allowable sub patterns at any node in the hierarchical structure. This is indicated by blocks 168 and 170 in FIG. 2. It will be noted that these are exemplary only, and component 119 can allow the developer to input other or different items as well. This is indicated by block 172.

Component 119 then creates the pattern/sub pattern definition based upon all of the developer's inputs. This is indicated by block 174. The pattern or sub pattern is then output for later use. This is indicated by block 176. By way of example, it can be added to pattern store 108. This is indicated by block 178. As another example, it can be added to a user interface selection mechanism that can be used by developer 114 in order to select a pattern or sub pattern. For instance, it can be added to a drop-down menu so that, when a developer is selecting a pattern or sub pattern during later use, the developer can select the newly created pattern or sub pattern. This is indicated by block 180. The pattern or sub pattern can be output in other ways as well, and this is indicated by block 182.

Figure 3:
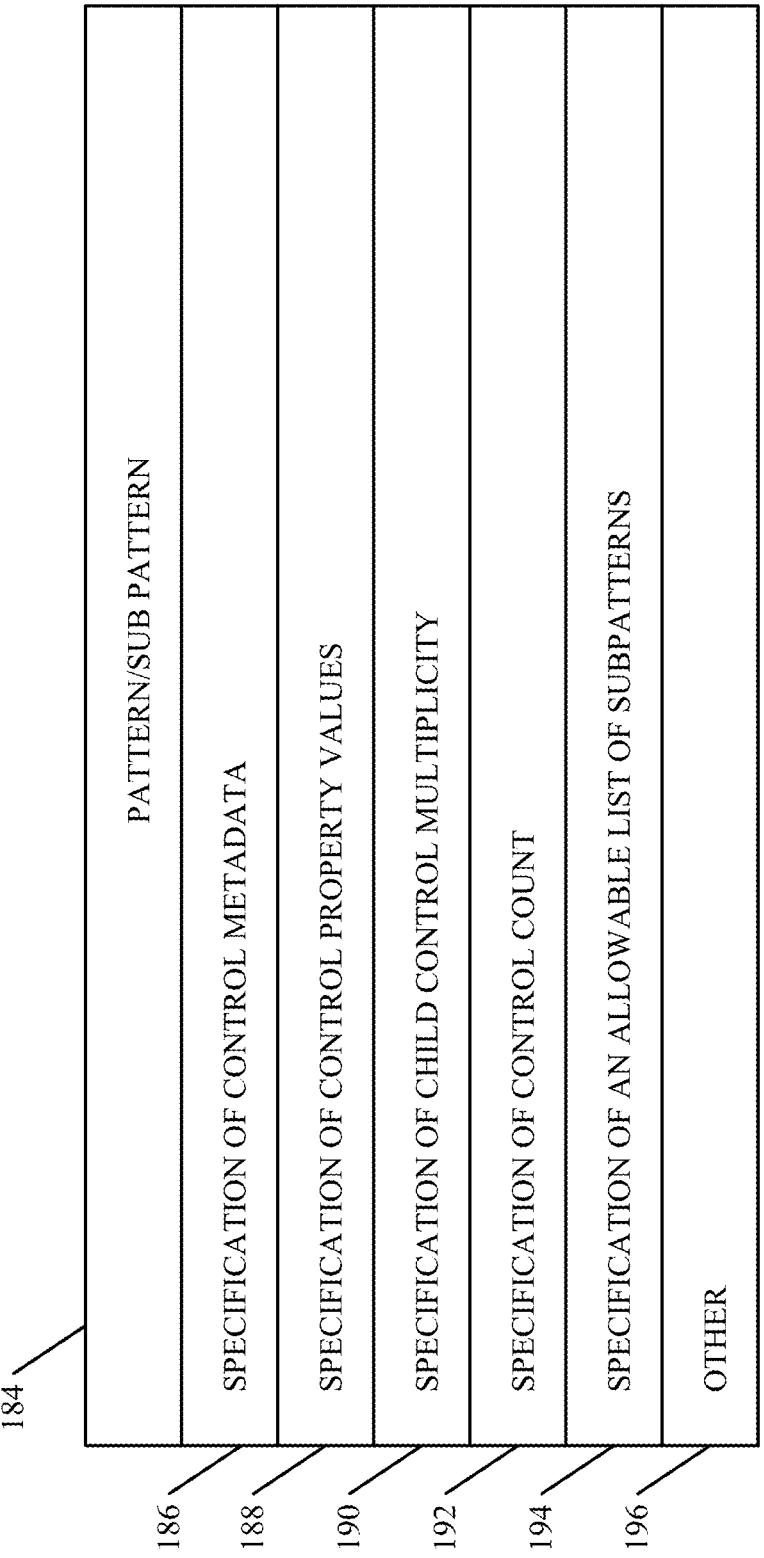
FIG. 3 is a block diagram of one illustrative pattern structure indicating how patterns can be defined.

FIG. 3 is a block diagram illustrating one structure for a pattern or sub pattern 184. It can be seen that pattern or sub pattern 184 includes a specification of control metadata 186, a specification of property values 188, a specification of child control multiplicity 190, a specification of control count 192, a specification of an allowable list of sub patterns 194, and it can include other information 196.

As a further example, Table 1 below shows one example tree structure of a simple list and details style form. In the embodiment shown in FIG. 1, the pattern has been applied to the root node (the form Design node).

TABLE 1

● Design | Pattern: Simple List and Details
   o ActionPanes (ActionPane)
      ■ . . .
   o PageTitle(Group)
      ■ Title (String)
   o Custom Filter (Group)
      ■ . . .
   o Body (Group)
      ■ ListContainer (Group)
         ● Grid (Grid)
            o . . .
      ■ Details (FastTab)
         ● Tab1 (TabPage)
            o . . .
         ● Tab2 (TabPage)
            o . . .

Table 2 below is an example of XML that defines what the pattern shown in Table 1 can look like.

TABLE 2

```
<Pattern Name="SimpleListAndDetails" Alias="Simple List and Details">
    <Control Name="Container" Type="$ContainerOrDesign">
        <Control Part="Actions" Type="ActionPane" Children="*"
        Count="0..1">
            <Property Name="Style">Standard</Property>
        </Control>
                <Control Part="Page Title Container" Type="Group"
Count="0..1" Children="*">
                <Property Name="Style">DetailTitleContainer
                </Property>
        </Control>
        <Control Name="CustomFilter" Part="Custom Filter" Type=
"Group" Count="0..1" Children="*">
            <Property Name="Style">CustomFilter</Property>
        </Control>
        <Control Part="Body" Type="Group">
            <Control Part="List Container" Type="Group">
                <Control Part="Grid" Type="Grid" Children=
                "*">
                </Control>
            <Control Part="Details" Type="Tab">
                <Property Name="WidthMode">SizeToAvailable
                </Property>
                <Property Name="HeightMode">SizeToAvailable
                </Property>
                <Property Name="Style">FastTabs</Property>
                <Control Type="TabPage" Count="*" Children="*">
            </Control>
            </Control>
        </Control>
    </Control>
</Pattern>
```

It can be seen that the XML definition shown in Table 2 contains both structural information and property values, all of which can be enforced during constrained authoring of a form according to this pattern. This is described in greater detail below with respect to FIG. 6. Table 2 also shows that, in one example, a Count property can be used to indicate where multiples or optional components are allowed.

Figure 4:
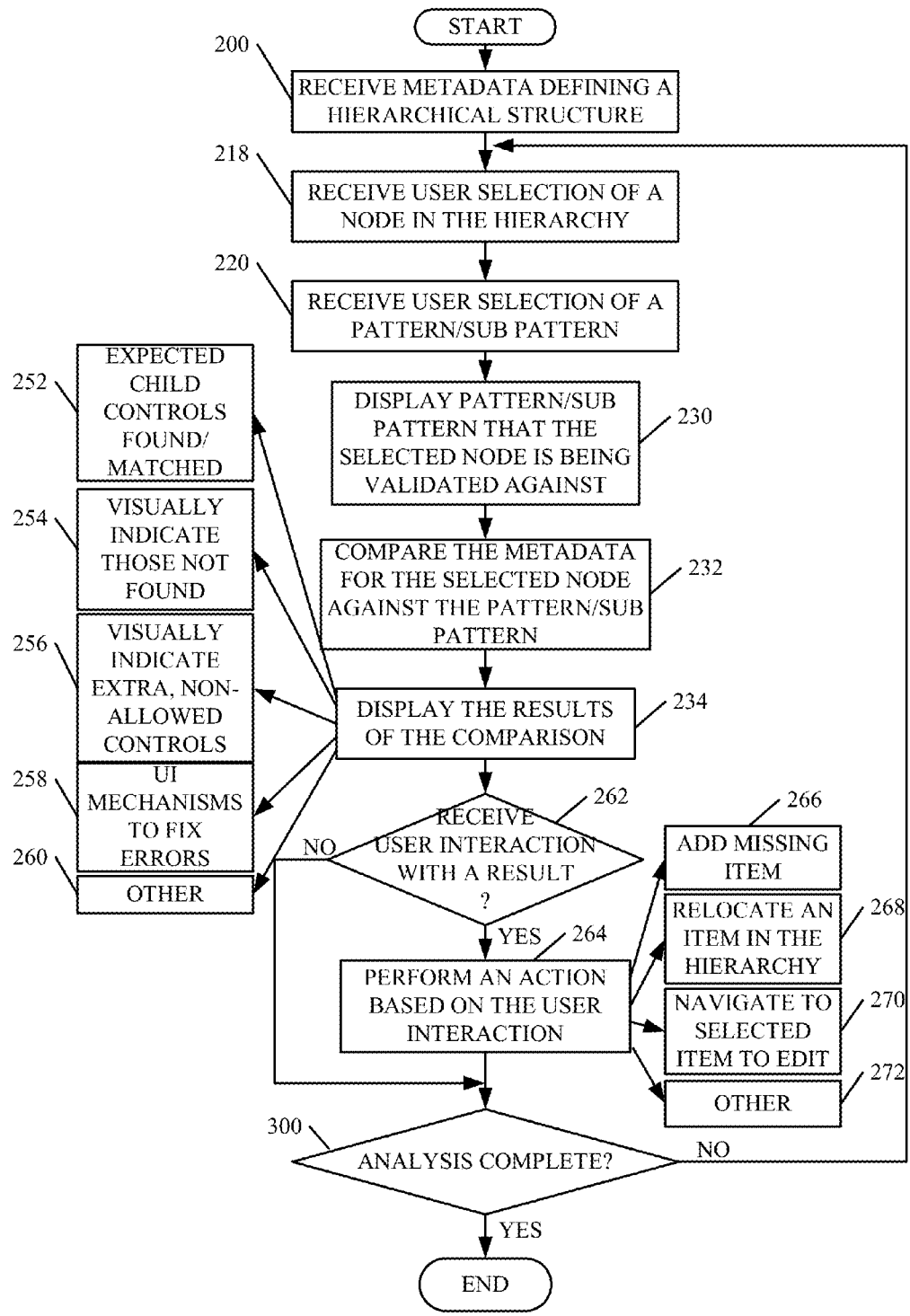
FIG. 4 is a flow diagram illustrating one embodiment of the operation of the architecture shown in FIG. 1 in validating patterns.

FIG. 4 is a flow diagram illustrating one embodiment of the operation of validation system 104 in validating a hierarchical structure that has been authored by developer 114 (or previously authored by developer 114 or a different author). As described above, if the entire hierarchical structure as already been authored, it may be submitted to validation system 104, even outside of the integrated development system 102, for validation. However, if the hierarchical structure is currently being authored by developer 114, then, in one embodiment, system 102 either includes validation system 104, or accesses it for validation intermittently during the authoring process (such as at compile, save, or at other times).

In any case, validation system 104 first receives metadata defining a hierarchical structure. This is indicated by block 200 in FIG. 4. In one embodiment, the hierarchical structure can include a hierarchically arranged definition of a form, for instance. Of course, other hierarchical data can be received as well.

Figure 4A:
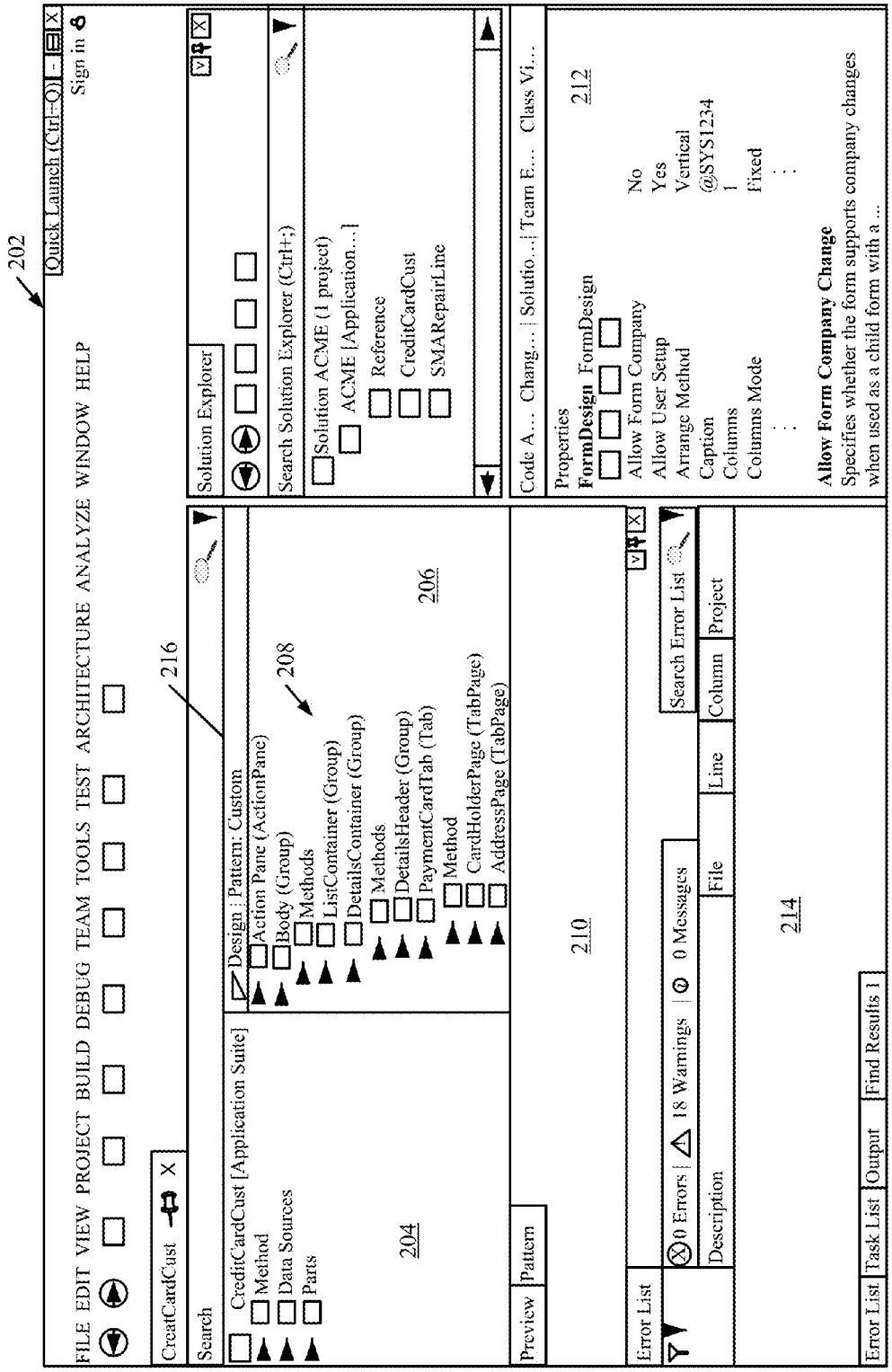
FIGS. 4A-4H are illustrative user interface displays.

FIG. 4A shows one example user interface display that indicates this. In FIG. 4A, user interface display 202 includes a form pane 204 that identifies forms, data sources and parts for the form. It also illustratively includes a design pane 206. Design pane 206 is shown generally displaying a hierarchical structure 208 that is to be validated by validation system 104. Display 202 also includes a pattern pane 210 that displays an expected structure, once a pattern has been selected by developer 114, a properties pane 212 that identifies properties that can be set for the form, and error pane 214 that is used to display any errors between a selected pattern and the hierarchical structure input for validation.

In FIG. 4A, developer 114 has not yet selected a pattern to validate hierarchical structure 208. Therefore, in the embodiment illustrated, the root node of the pattern is identified generally at 216, as "custom". Of course, other labels could be applied as well.

Once validation system 104 has received any or all of the hierarchical structure indicated generally at 208 for validation, it can illustratively receive user selection of a node in the hierarchy. This is indicated by 218 in the flow diagram of FIG. 4. In the embodiment shown in FIG. 4A, for instance, the highest (or root) node "design pattern: custom" has been selected by the developer 114. This is visually indicated by highlighting that node, although other ways of indicating the selected node can be used as well.

Validation system 104 then receives user selection of a pattern or sub pattern, against which to validate the selected node. This is indicated by block 220 in FIG. 4.

Figure 4B:
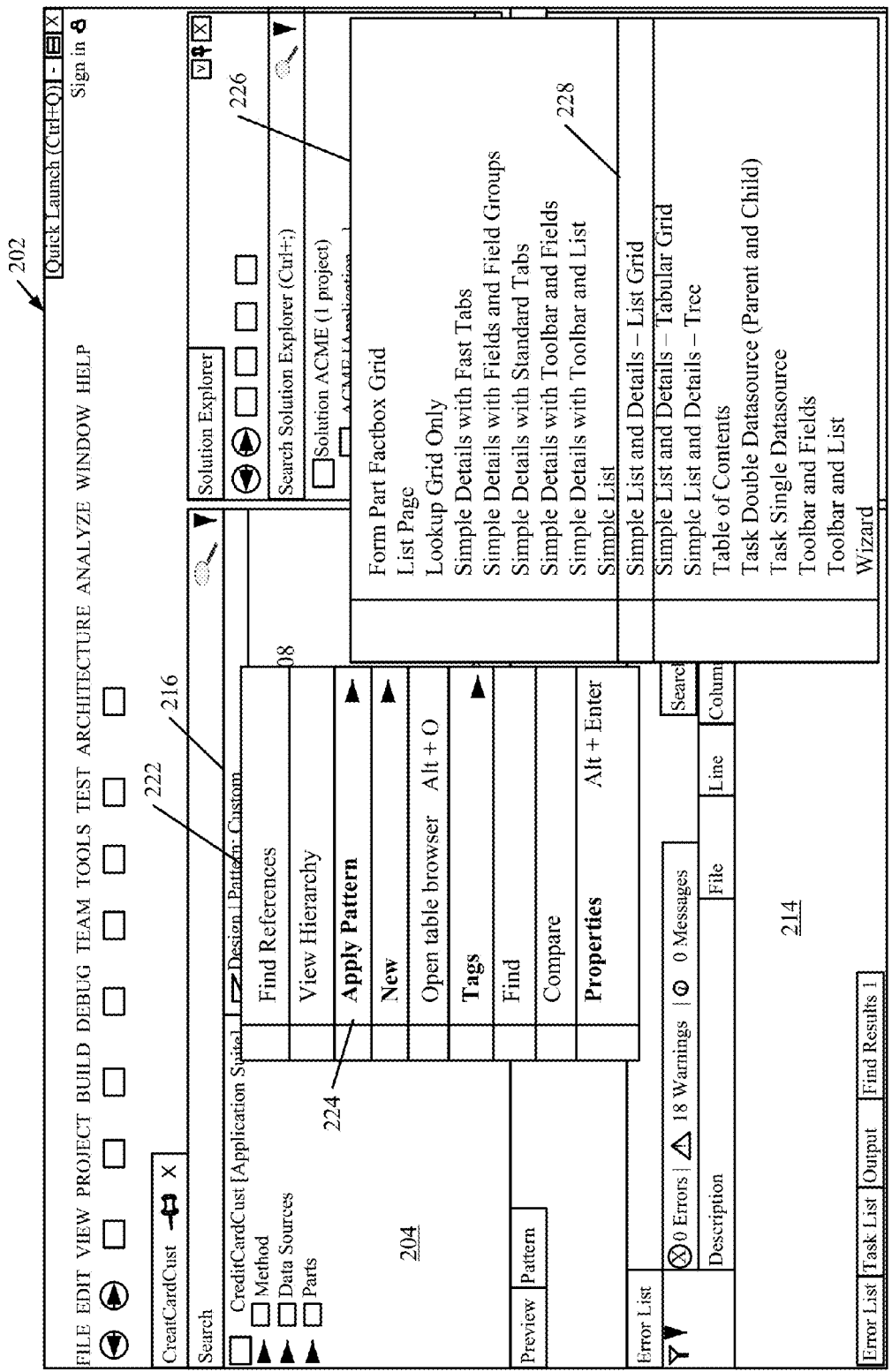

FIG. 4B shows another embodiment of user interface display 202. Some items are similar to those shown in FIG. 4A, and they are similarly numbered. However, FIG. 4B shows that the developer 114 has now provided an input to select a pattern against which to validate the hierarchical structure 208. By way of example, it may be that the developer has right clicked on the context menu portion of display 202. This illustratively generates a display of menu 222. The developer has also selected the "Apply Pattern" user input mechanism 224, which results in the display 226 showing a set of patterns that can be applied at the node selected by the developer. It can be seen that the developer has also selected the particular pattern named "Simple List and Details—list grid" generally indicated at number 228, in the user interface display 226.

Once the pattern has been selected for application to the selected node in hierarchical structure 208, pattern validation system 104 illustratively displays the selected pattern in pane 210. This is indicated by block 230 in FIG. 4. Pattern analyzer component 140 then compares the hierarchical structure 208 to the expected pattern against which hierarchical structure 208 is being validated. The results of that comparison are then also displayed. This is indicated by blocks 232 and 234 in FIG. 4.

Figure 4C:
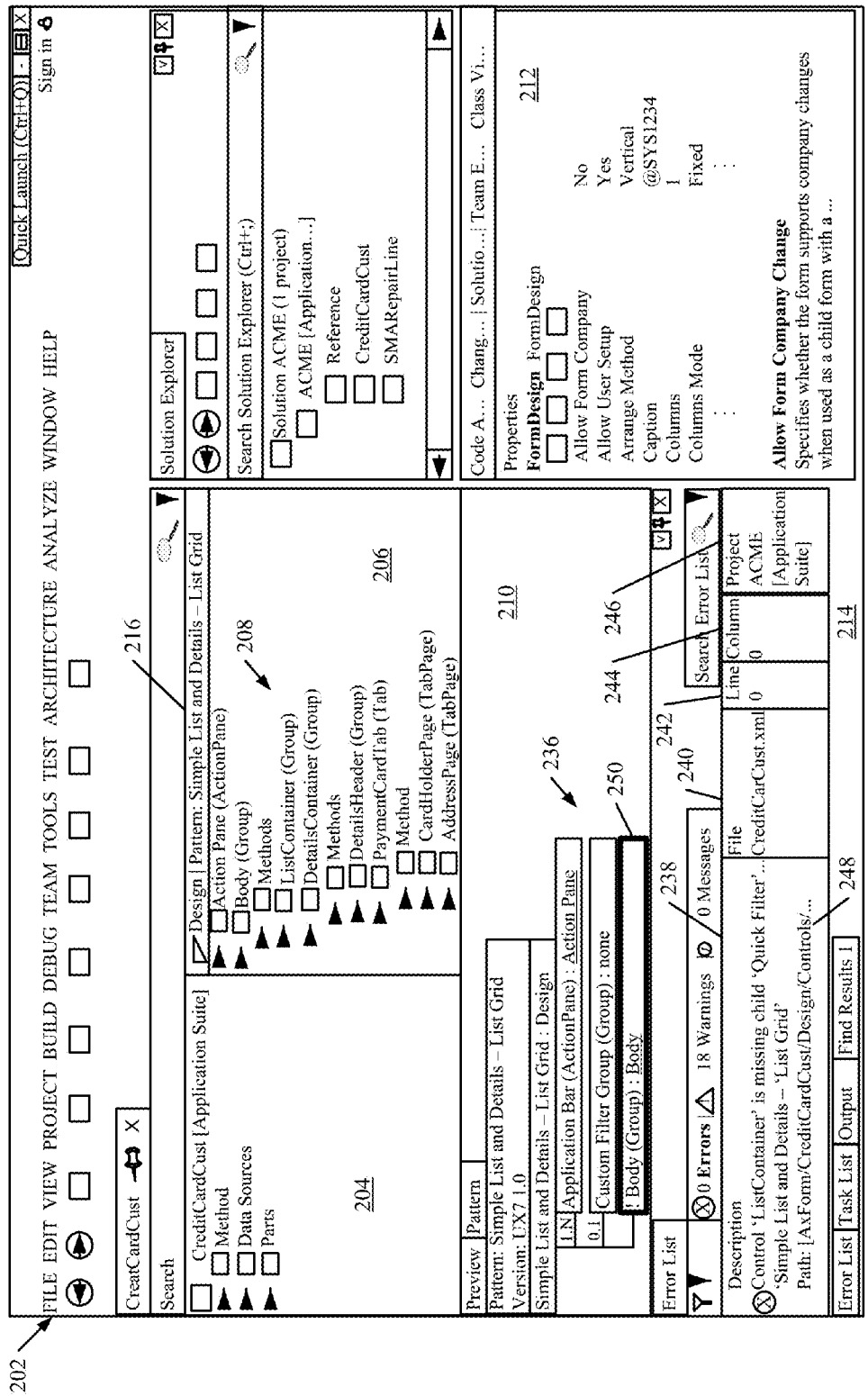

FIG. 4C shows user interface display 202 that illustrates this. Some of the items are the same as shown in FIGS. 4A and 4B, and they are similarly numbered. However, it can be seen that pattern pane 210 now illustratively displays the expected pattern indicated generally at 236. The expected pattern shows that, for the selected node 216, a hierarchical structure, generally as indicated, is expected. It can also be seen that, at node 216, the pattern is now identified as "Simple List and Details—list grid".

It can be seen in FIG. 4C, that error pane indicates that the hierarchical structure 208 contains an error. The error is identified in pane 204, by a description section 238, a file identifier section 240, and line, column and project identifiers 242, 244 and 246, respectively. The description indicates that the "ListContainer" is missing a child referred to as "QuickFilter". The description also indicates that the child is required by the pattern and it lists the pattern that requires it. It also illustratively includes a navigable link 248. If the user actuates the navigable link, the user will be navigated to the particular portion of the form that contains the error.

In one embodiment, pane 210 also identifies a location of the error. For instance, it can be seen in the overall structure 236 that node 250 is visually distinguished from the remaining structure. This identifies the portion of hierarchical structure 208 that contains the error, as well.

FIG. 4C is just one example of how the selected pattern or sub pattern can be displayed, and how the results of the comparison of that pattern against the hierarchical structure being validated can be displayed. They can be displayed in a wide variety of other ways. They can be displayed to show expected child controls that were found or matched during the validation process. This is indicated by block 252. They can also be displayed by visually indicating expected portions of the pattern that were not found. This is indicated by block 254. They can be displayed by visually indicating extra, non-allowed controls. This is indicated by block 256. They can also be displayed with user input mechanisms that can be actuated by developer 114 in order to remedy the errors. This is indicated by block 258. For instance, where a missing node is found, the display can include an "add" user input mechanism that can be actuated by developer 114 in order to add the missing node. Of course, other user input mechanisms (such as the navigable link 248 or others) can be used as well. The results of the comparison can be displayed in a wide variety of other ways as well, and this is indicated by block 260.

In one embodiment, developer 114 can then interact with a result or another user input mechanism on display 202. In response, validation system 104 illustratively takes action based upon the user interaction. This is indicated by blocks 262 and 264 in FIG. 4. For instance, if the developer actuates an appropriate user input mechanism, validation system 104 can automatically add missing items. This is indicated by block 266. In another embodiment, the developer can illustratively drag and drop various structures around display 202 and they can be relocated in that way. For instance, if pattern pane 210 indicates that a node is missing from structure 208, then in one embodiment, the developer can simply drag that node from pane 210 to the appropriate location in structure 208, and the node is automatically inserted. This is indicated by block 268 in FIG. 4. Developer 114 can also navigate to the precise location of an error using navigable link 248. This is indicated by block 270. The user can perform other interactions with the display as well, and this is indicated by block 272.

Figure 4D:
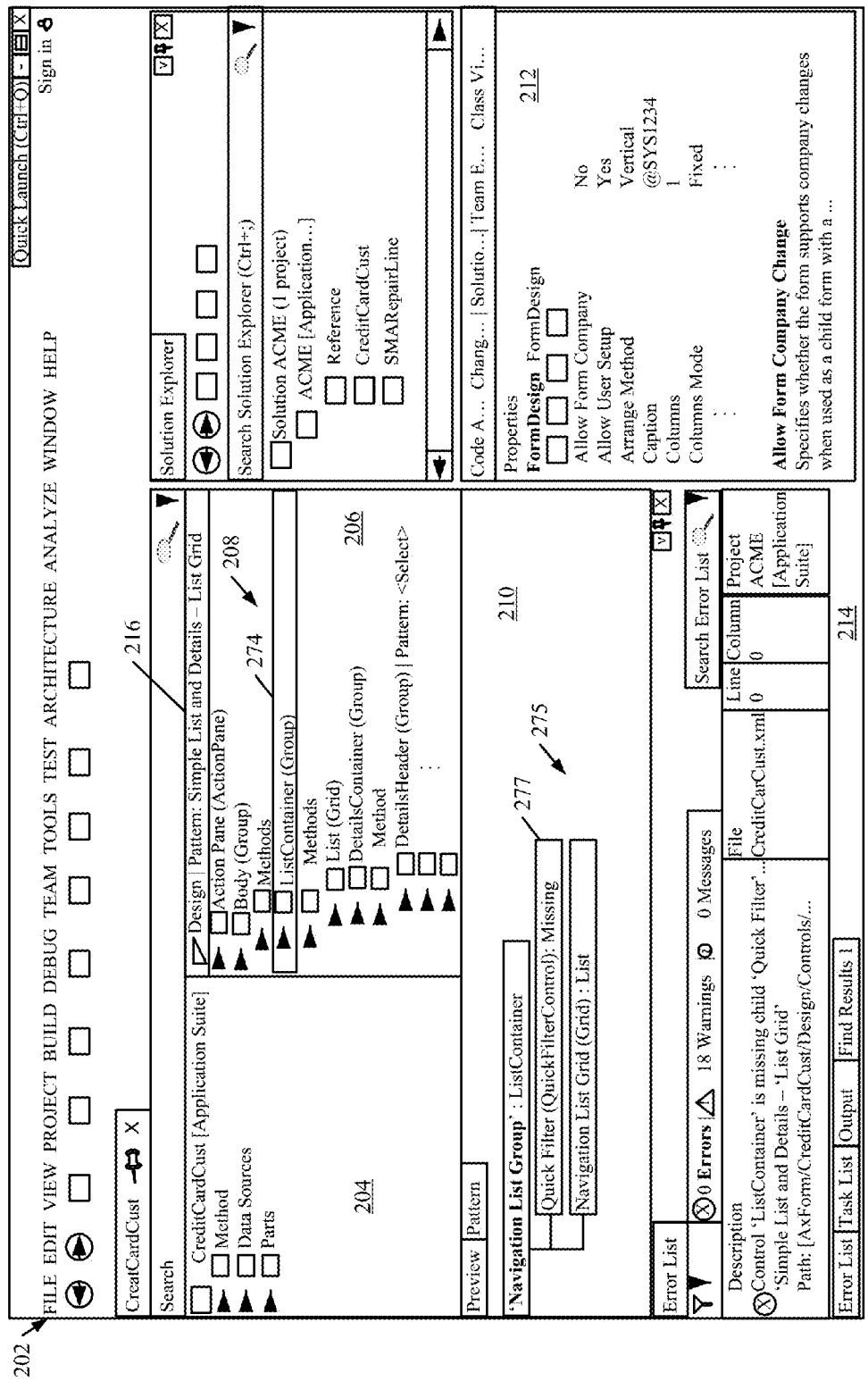

FIG. 4D shows an example where the user has actuated navigable link 248. In that case, the user is navigated to the "list container" node 274 in hierarchical structure 208, because that is the node where the error occurs. Pattern panel 210 in FIG. 4D then displays the pattern expected for the highlighted node 274. This is shown generally by hierarchical structure 275. It can be seen that hierarchical structure 275 shows the "quick filter" node 277 and indicates that it is missing from hierarchical structure 208, being validated. In one embodiment, developer 114 can add the missing node simply by clicking on it in pane 210. In another embodiment, the developer can use a drag and drop input, dragging the node 277 from pane 210 to an appropriate location in hierarchical structure 208. In another example, the user can right click to view a context menu where nodes (e.g., controls) can be added to structure 208 by selecting them from a list.

Figure 4E:
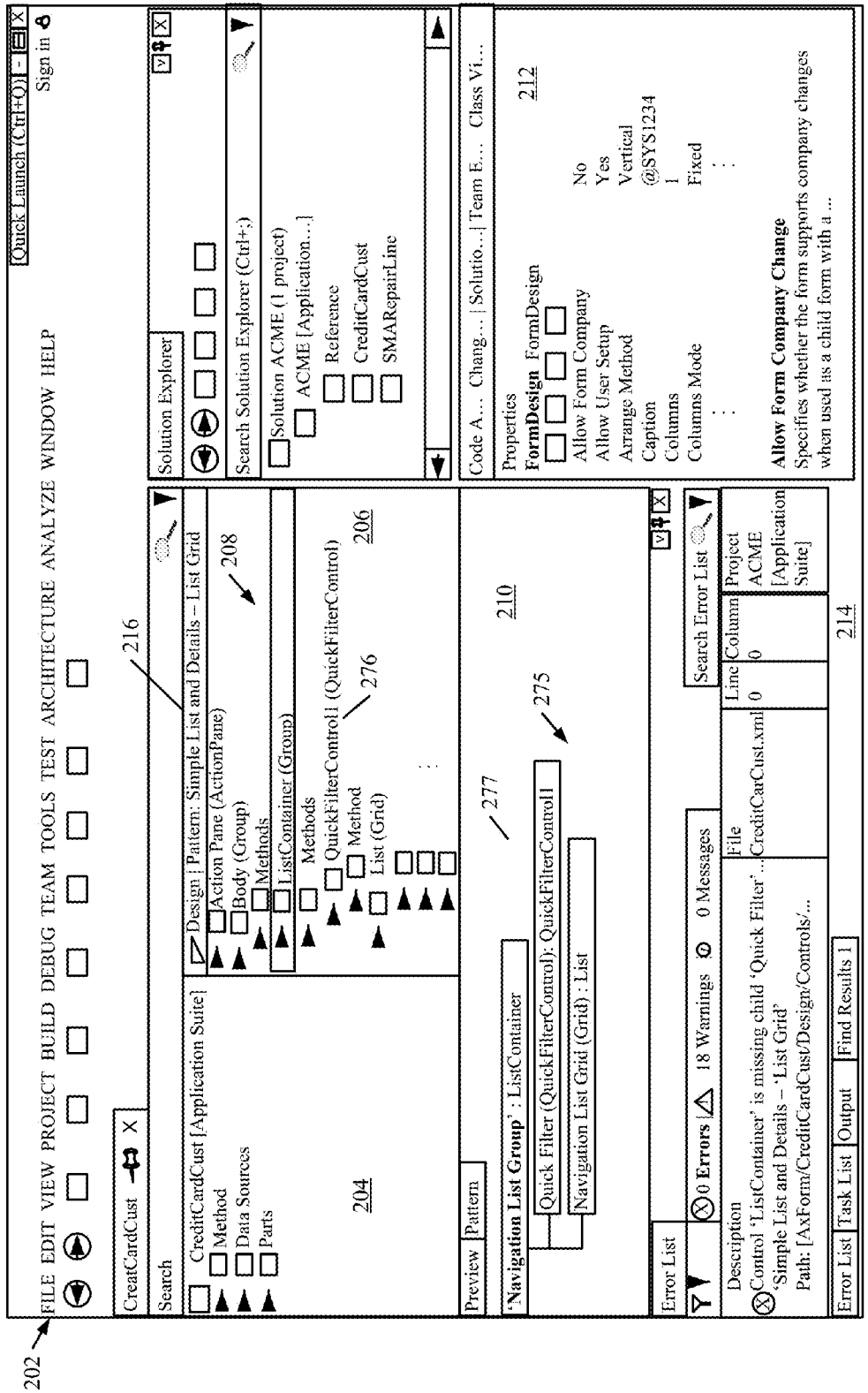

FIG. 4E shows that the developer has taken remedial action, by adding quick filter node 276 to hierarchical structure 208 at the desired location. It can thus be seen that panes 210 and 214 now displays no errors.

Figure 4F:
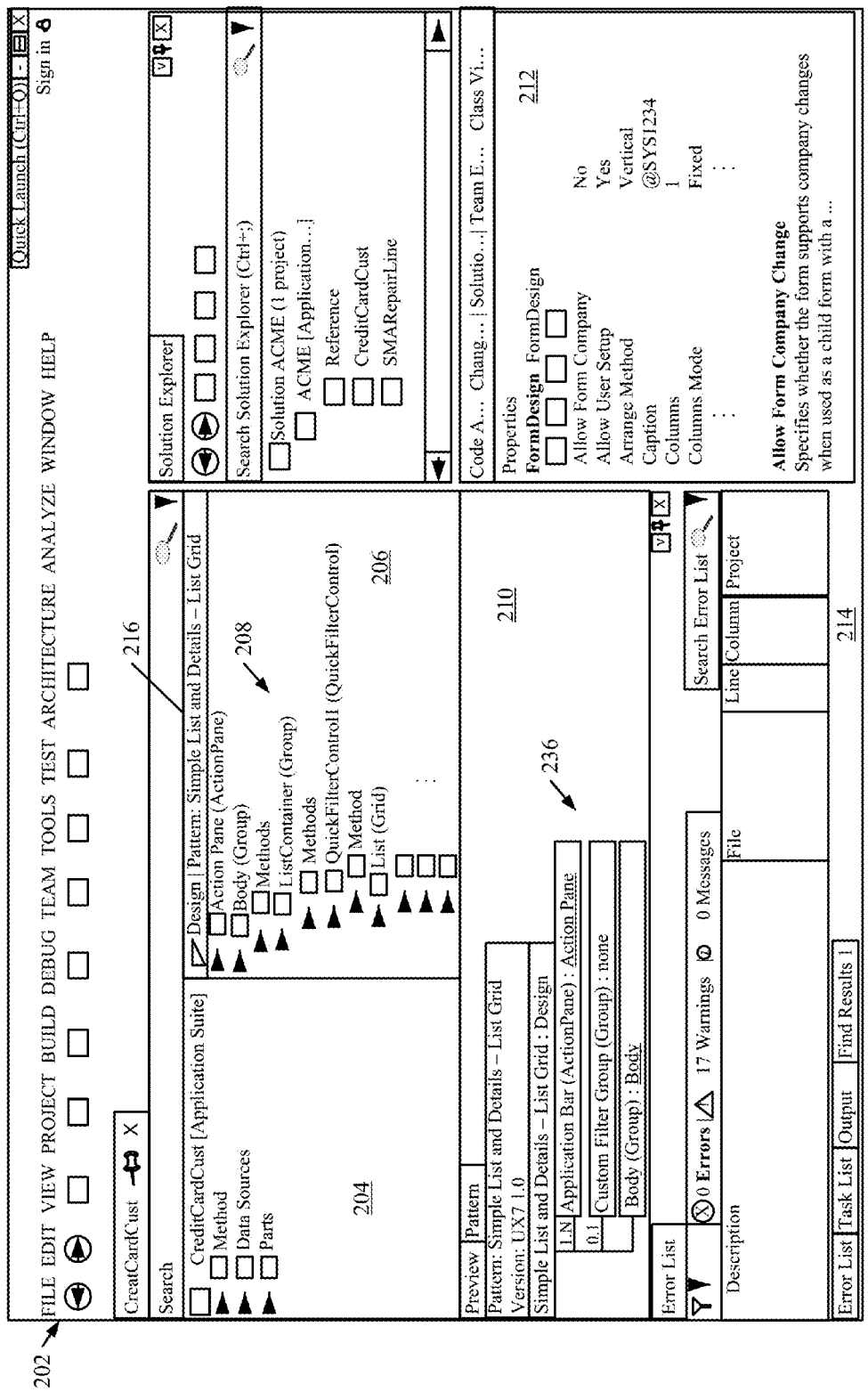

FIG. 4F shows another embodiment of user interface display 202, where developer 114 has refocused on the root node 216 of hierarchical structure 208. It can now be seen that pattern pane 210, and error pane 214 indicate that hierarchical structure 208 is now correct.

In one embodiment, once the pattern in hierarchical structure 208 is correct, constraint system 116 (shown in FIG. 1) illustratively constrains the user interface mechanisms available to developer 114. This is described in greater detail below with respect to FIG. 6. Briefly, however, when hierarchical structure 208 properly conforms to the selected pattern, a number of the property values will be automatically set by hierarchical data generator 120. When they are set, constraint system 116 removes them from the development environment, so that developer 114 cannot easily change them. This is because any change to those property values would result in the hierarchical structure 208 coming into non-conformance with the selected pattern.

As a specific example, it can be seen in FIG. 4C that a set of properties, identified as "ArrangeMethod", "ColumnsMode", and "Columns" appear in the list of properties in pane 212. However, because hierarchical structure 208 now conforms to the selected pattern (e.g., the "Simple List and Details—list grid" pattern) these property values are now controlled by the pattern. Therefore, they are removed from the list of properties that can be set by developer 114, and that are displayed in pane 212. In one embodiment, this can be done for all nodes that are part of the pattern, and not just the root node 216.

Analysis of hierarchical structure 208 is eventually complete. That is, the user can select various nodes within structure 208 and correct errors, or have patterns and sub patterns applied etc. Once the analysis is complete, however, the hierarchical structure 208 will be validated. This is indicated by block 300 in FIG. 4.

Before describing how pattern elements can be automatically populated during the authoring experience, and before describing how the developer experience is constrained based on selected patterns, a number of other embodiments will first be described.

Figure 4G:
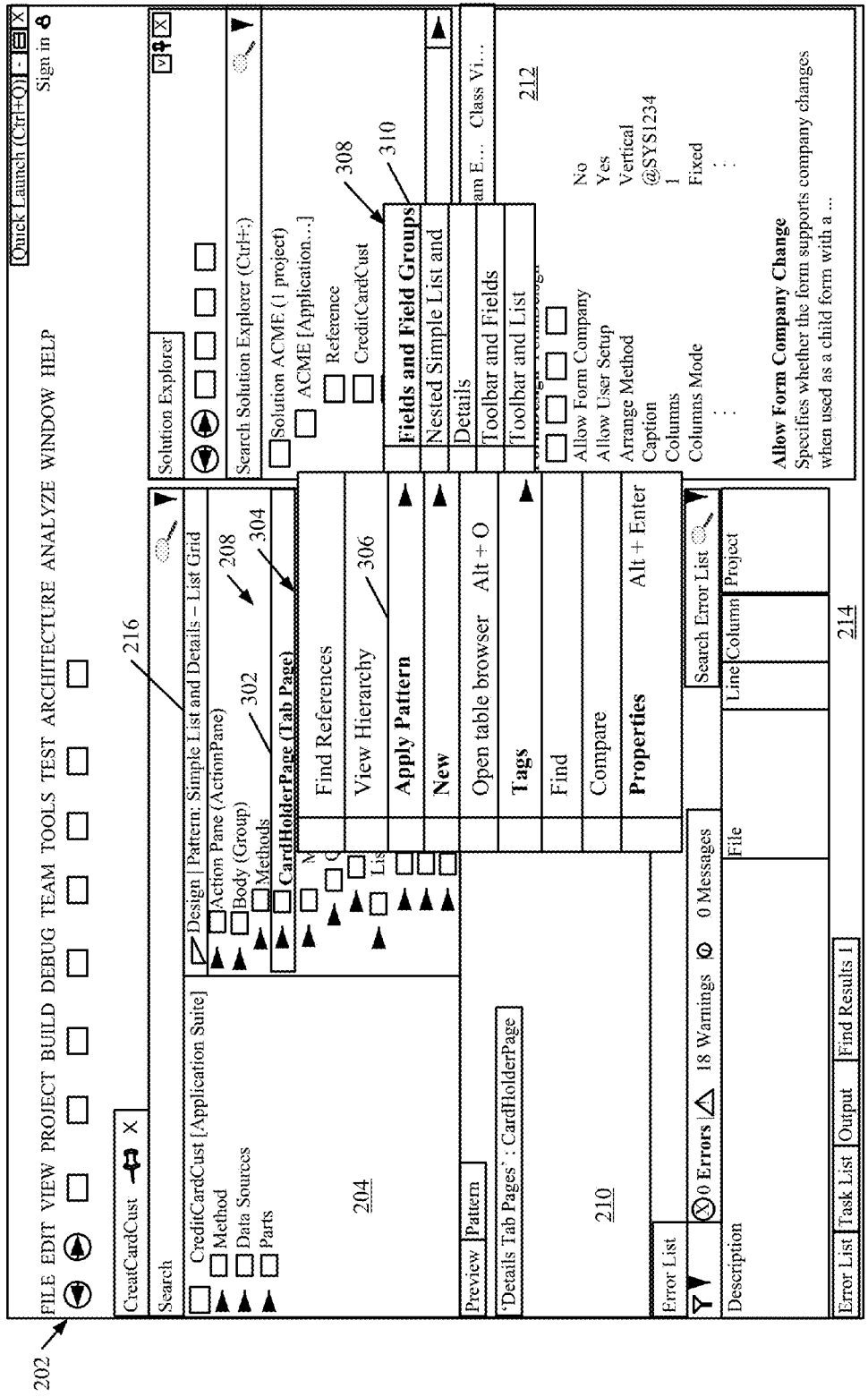

FIG. 4G, for instance, shows that developer 114 has now focused on one of the tab page nodes 302, within hierarchical structure 208. In the embodiment illustrated, the top-level pattern (the "Simple List and Details" pattern) does not apply to the nodes under the "tab pages" node 302. Therefore, when the developer selects node 302 and provides an input indicating that the user wishes to apply a pattern to that node (e.g., right clicks on it), menu 304 is illustratively displayed. Again, when the developer selects the "Apply Pattern" mechanism 306, menu 308 is illustratively displayed. Menu 308 shows a list of sub patterns that can be applied to the tab pages node 302. It can be seen in FIG. 4G that the user has selected the "fields and field group" sub pattern 310. When the developer does this, pattern analyzer component 140 in validation system 104 (shown in FIG. 1) applies the selected sub pattern to the selected node 302. Validation system 104 then performs the same types of validation described above with respect to FIG. 4, but for the sub pattern as applied to the node 302 selected in hierarchical structure 208.

Figure 4H:
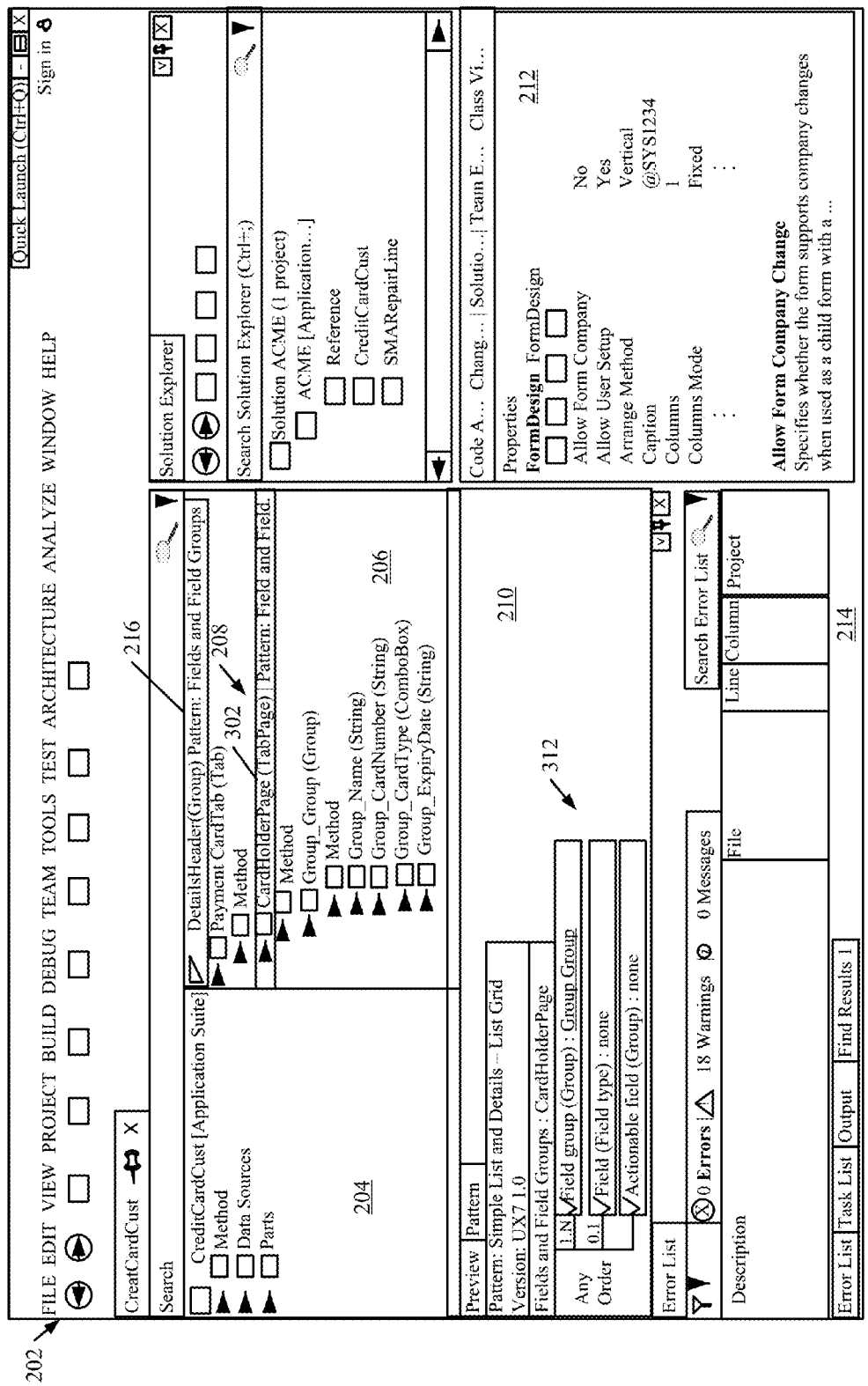

FIG. 4H shows that panel 210 now displays the expected sub pattern 312, and error pane 214 shows that no errors exist. That is, the tab pages node 302 selected by developer 114 has a structure which conforms to the expected structure 312 shown in pane 210.

Figure 5:
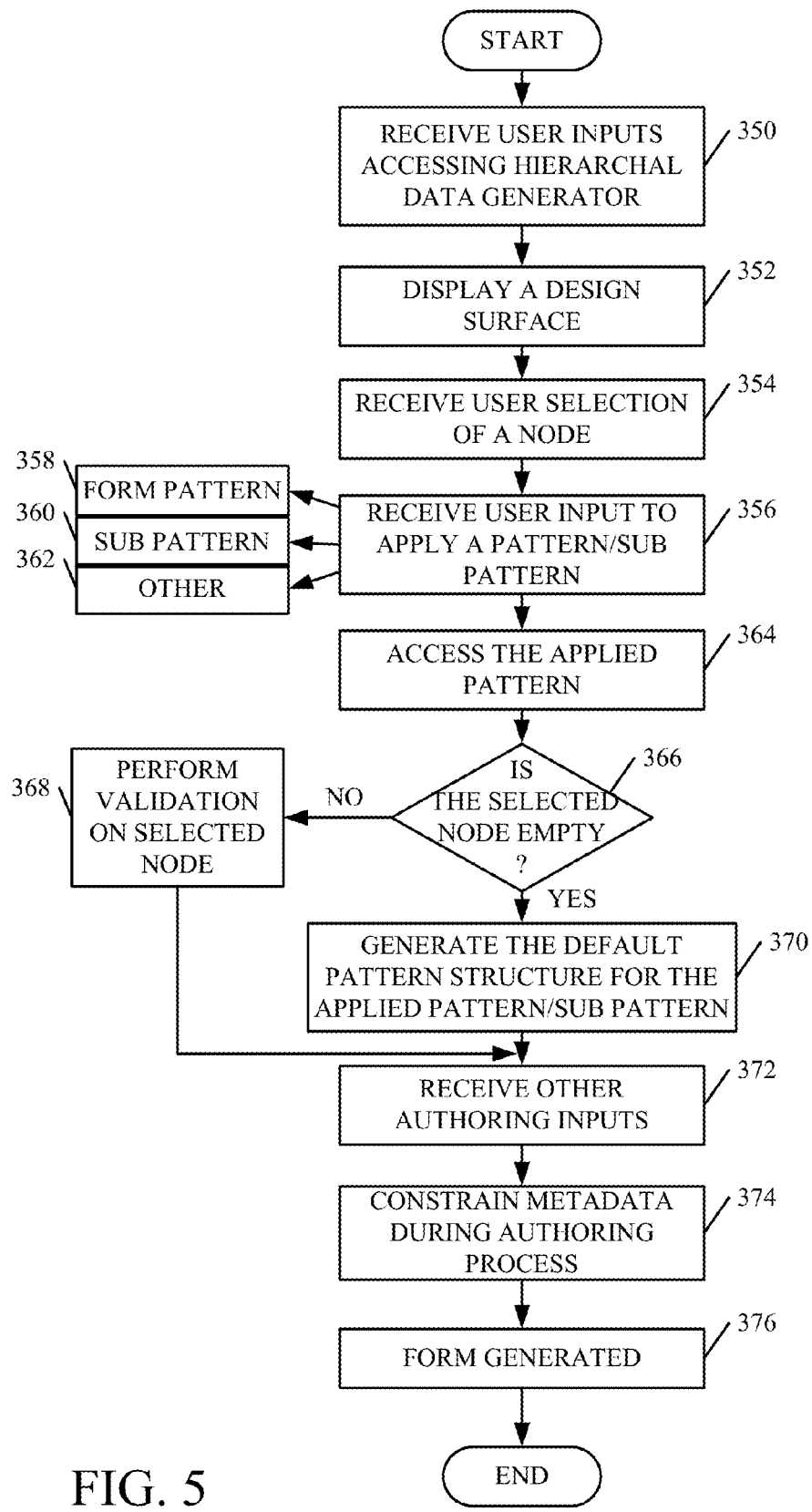
FIG. 5 is a flow diagram illustrating one embodiment of the operation of the architecture shown in FIG. 1 in generating a display using a pattern.

FIG. 5 is a flow diagram illustrating one embodiment of the operation of generation system 118 in FIG. 1, in generating a user experience for developer 114, as the developer is authoring hierarchical data. FIG. 5 shows that developer 114 first accesses hierarchical data generator 120. This is indicated by block 350 in FIG. 5. This can be done, for instance, by the developer logging into the system, providing authentication information, or in other ways.

Generator 120 then illustratively displays a design surface so that the developer can begin inputting hierarchical information in order to, for example, author a form. This is indicated by block 352.

Referring again to FIG. 4A, hierarchical data authoring functionality 132 allows the user to create or author the hierarchical structure 208 on pane 206. The user can do this by adding elements, selecting them from drop-down menus, or performing other authoring operations.

In one embodiment, the user may wish to apply a pattern to the hierarchical structure underneath one of the nodes in structure 208. In that case, the user selects one of the nodes. This is indicated by block 354.

Pattern selection component 130 then receives a user input indicating that the user wishes to select a pattern. This may be, as discussed above, right clicking on the node and then selecting the "Apply Pattern" user input mechanism 224 (such as shown in FIG. 4B). This is indicated by block 356. The user can then select to apply an overall form pattern (such as where the user is selecting a pattern for root node 216). This is indicated by block 358. On the other hand, where the user has selected a dependent node within hierarchical structure 208, the user may be applying a sub pattern. This is indicated by block 360 in FIG. 5 and was described above with respect FIGS. 4G and 4H.

The user can of course apply a pattern in other ways as well. This is indicated by block 362.

In response, generation system 118 then accesses the pattern or sub pattern to be applied from pattern store 108. This is indicated by block 364. Generation system 118 then determines whether the selected node is empty. For instance, when developer 114 is authoring data structure 208, the developer 114 may select a node for which no child or dependent nodes have yet been authored. This is indicated by block 366 in FIG. 5. If the node is not empty, then generation system 118 notifies validation system 104, and validation system 104 performs validation (as described above with respect to FIG. 4) on the hierarchical structure under the selected node. This is indicated by block 368.

However, if, at block 366, the selected node is empty, then generation system 118 automatically generates the default pattern structure for the pattern or sub pattern that the user has selected for application to that node. This is indicated by block 370. For instance, referring again to FIG. 4A, assume that the user had selected the "ListContainer" node in pane 206 and that all of the content below that node was empty. If that were the case, then generation system 118 would automatically add the dependent nodes that are found in the selected sub pattern that the user has elected to apply. That way, the user may add optional nodes, but at least the nodes that are required by the selected sub pattern will already be placed in the hierarchical structure.

Hierarchical data generator 120 can receive additional authoring inputs. This is indicated by block 372.

During the entire authoring process, constraint system 116 constrains the authoring process as briefly mentioned above, and as is described below with respect to FIG. 6. Constraining the user experience is indicated by block 374.

Eventually, the form (or other hierarchical structure) will be suitable for use in a computer system. This is indicated by block 376.

Figure 6:
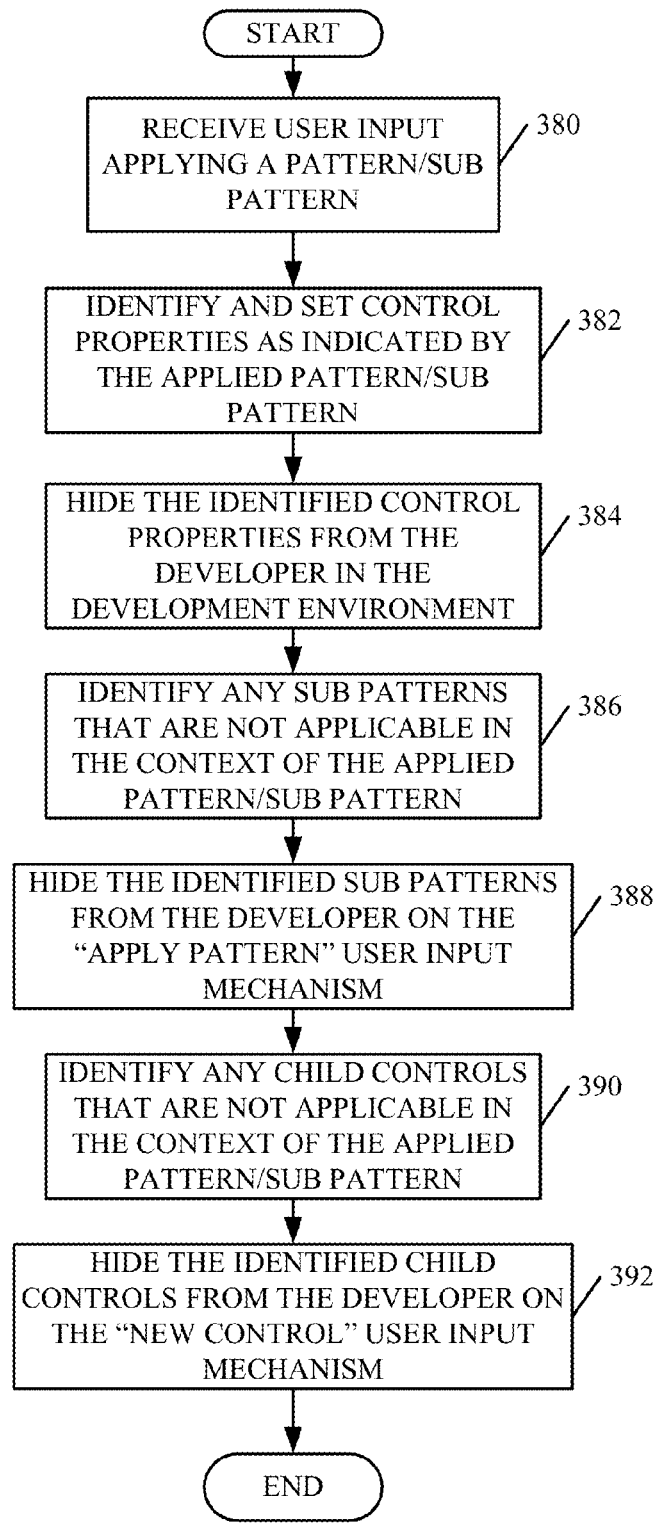
FIG. 6 is a flow diagram illustrating one embodiment of the operation of the architecture shown in FIG. 1 in constraining user development, using a pattern.

FIG. 6 shows a flow diagram illustrating one embodiment of the operation of constraint system 116 shown in FIG. 1, in constraining the authoring experience based on a selected pattern. First, as described above, constraint system 116 is notified that hierarchical data generator 120 has received a user input indicating that the developer 114 wishes to apply a pattern or sub pattern. This is indicated by block 380 in FIG. 6. Constraint system 116 then identifies and sets control properties as indicated by the applied pattern or sub pattern. As described above with respect to FIG. 4F, some of the properties may be dictated by the selected pattern or sub pattern. In that case, those properties are identified and set by constraint system 116. This is indicated by block 382.

Those properties are then hidden from the developer in the development environment, so that they cannot be changed by developer 114. This is indicated by block 384.

Constraint system 116 also identifies any sub patterns that are not applicable in the context of the applied pattern or sub pattern. For instance, when the user selects and applies a pattern to a hierarchical structure, it may be that some of the sub patterns are not applicable to that pattern. Therefore, those sub patterns are identified and hidden from developer 114 on the "Apply Pattern" user input mechanism. Identifying and hiding the non-applicable sub patterns is indicated by blocks 386 and 388 in FIG. 6.

Constraint system 116 then identifies any child controls that are not applicable to the context of the applied pattern or sub pattern. This is indicated by block 390. As is the case with sub patterns, there may be child controls that are not applicable when a given pattern or sub pattern is selected for application by the developer. In that case, they are identified and hidden from the developer in the "New Control" user input mechanism. Hiding such child controls is indicated by block 392.

It can thus be seen that the present description provides a way in which a developer can advantageously be constrained, at the development stage, to developing forms that conform to desired patterns. The description maintains a great deal of flexibility and can even be used to validate previously-authored forms or other hierarchical data structures that conform to a pattern. The description advantageously and quickly notifies the developer where the authored structure does not conform to the pattern and can provide navigable links so the developer can quickly and easily locate and address errors in the authored data. This improves the accuracy of the authored data, and it improves the performance of the development environment, itself. By allowing the developer to be constrained or influenced to develop according to an expected pattern, the system produces more accurate development results. It improves the developer's experience, because the developer knows, during development, whether errors are being made and can correct them at the time. It also allows the developer great flexibility in that already-developed structures can be validated as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
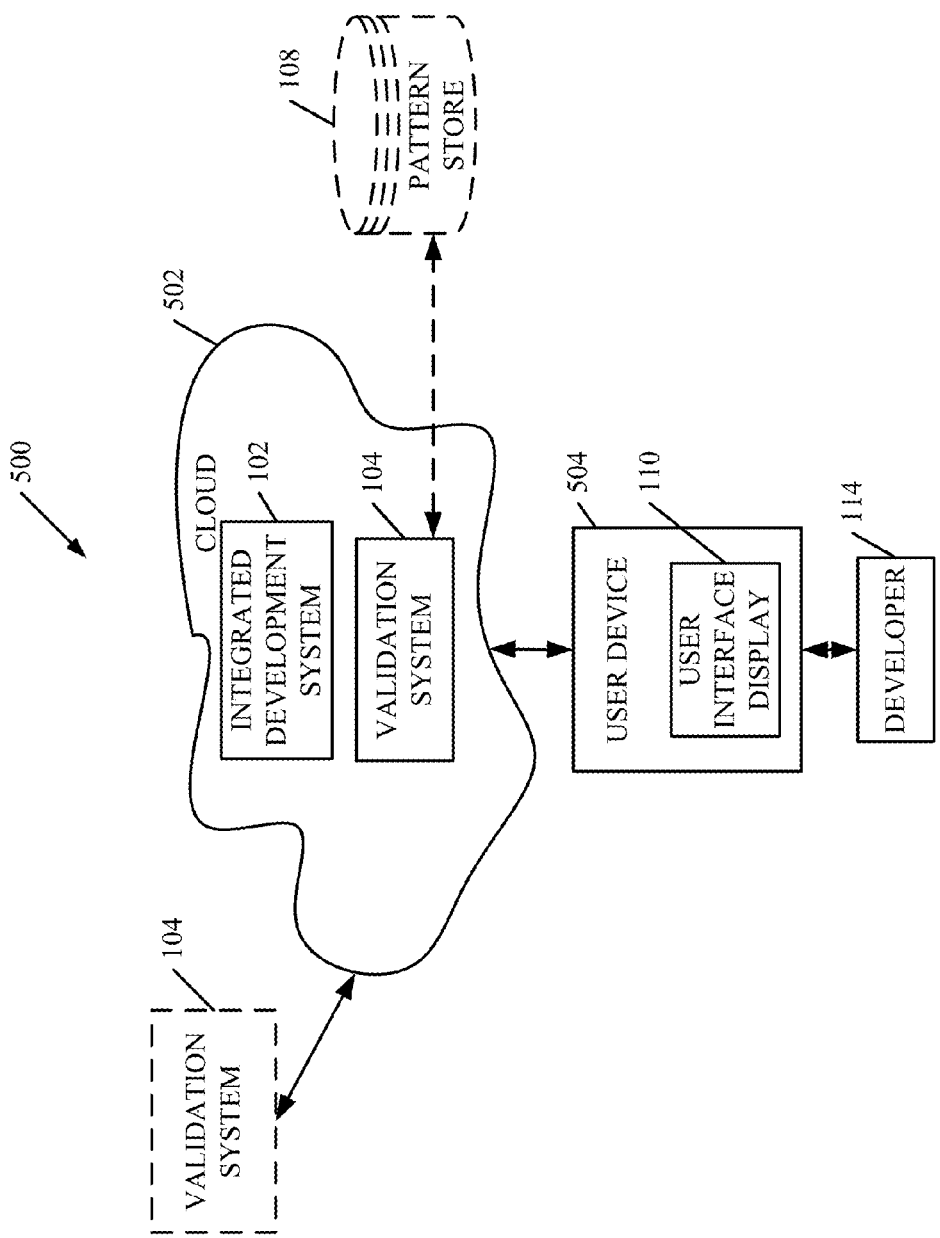
FIG. 7 is a block diagram showing one embodiment of the architecture illustrated in FIG. 1, deployed a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that integrated development system 102 and validation system 104 can be located in cloud 502 (which can be public, private, or a combination where portions are public while others are private). Therefore, developer 114 uses a user device 504 to access those systems through cloud 502.

FIG. 7 also depicts another embodiment of a cloud architecture. FIG. 7 shows that it is also contemplated that some elements of architecture 100 can be disposed in cloud 502 while others are not. By way of example, data store 108 can be disposed outside of cloud 502, and accessed through cloud 502. In another embodiment, validation system 108 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
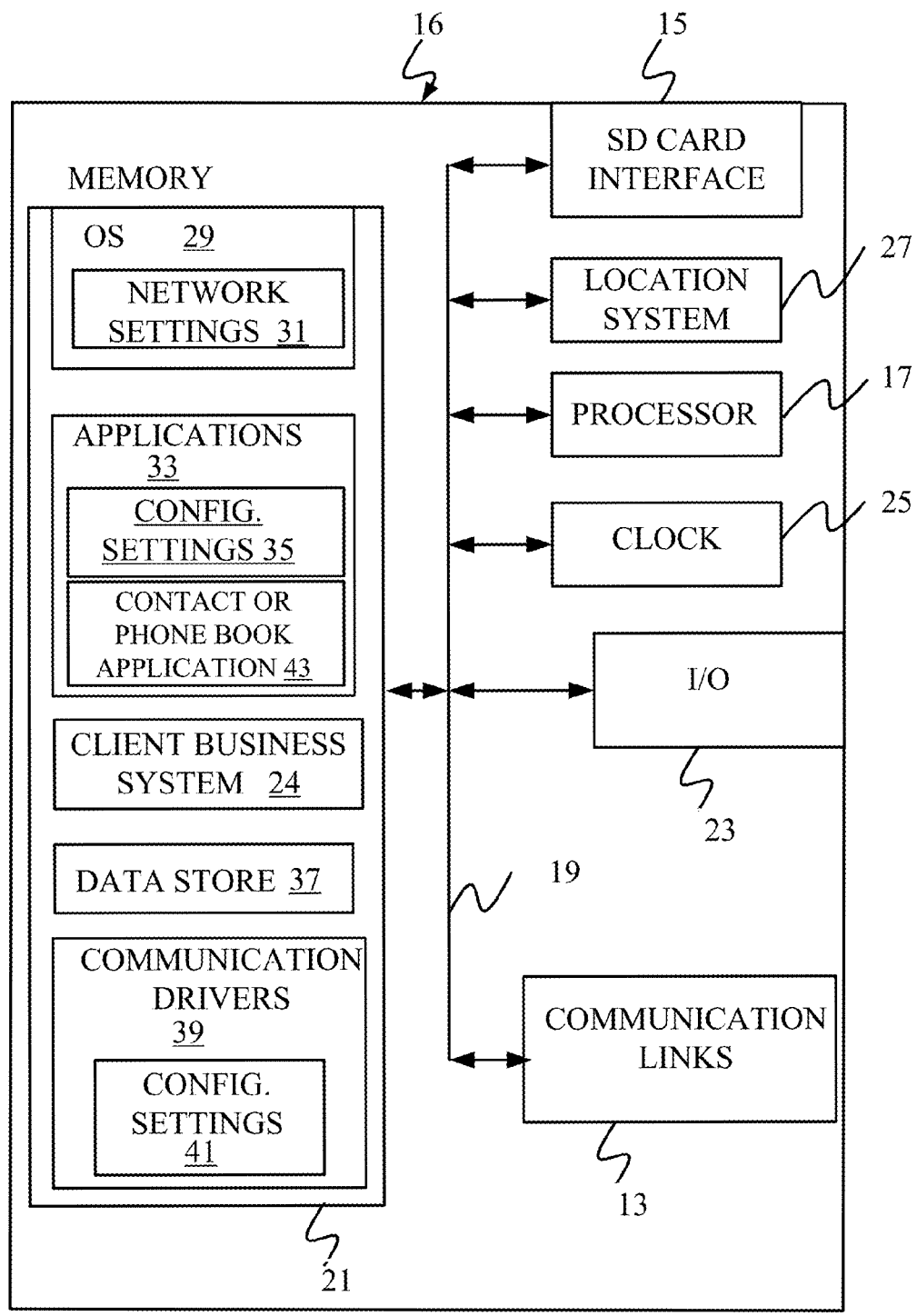
FIGS. 8-12 show various embodiments of mobile devices that can be used with the architecture shown in FIG. 1.

FIG. 8 is a simplified block diagram of one illustrative embodiment of a handheld or mobile computing device that can be used as a user's or client's hand held device 16, in which the present system (or parts of it) can be deployed. FIGS. 9-12 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 122 or 148 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
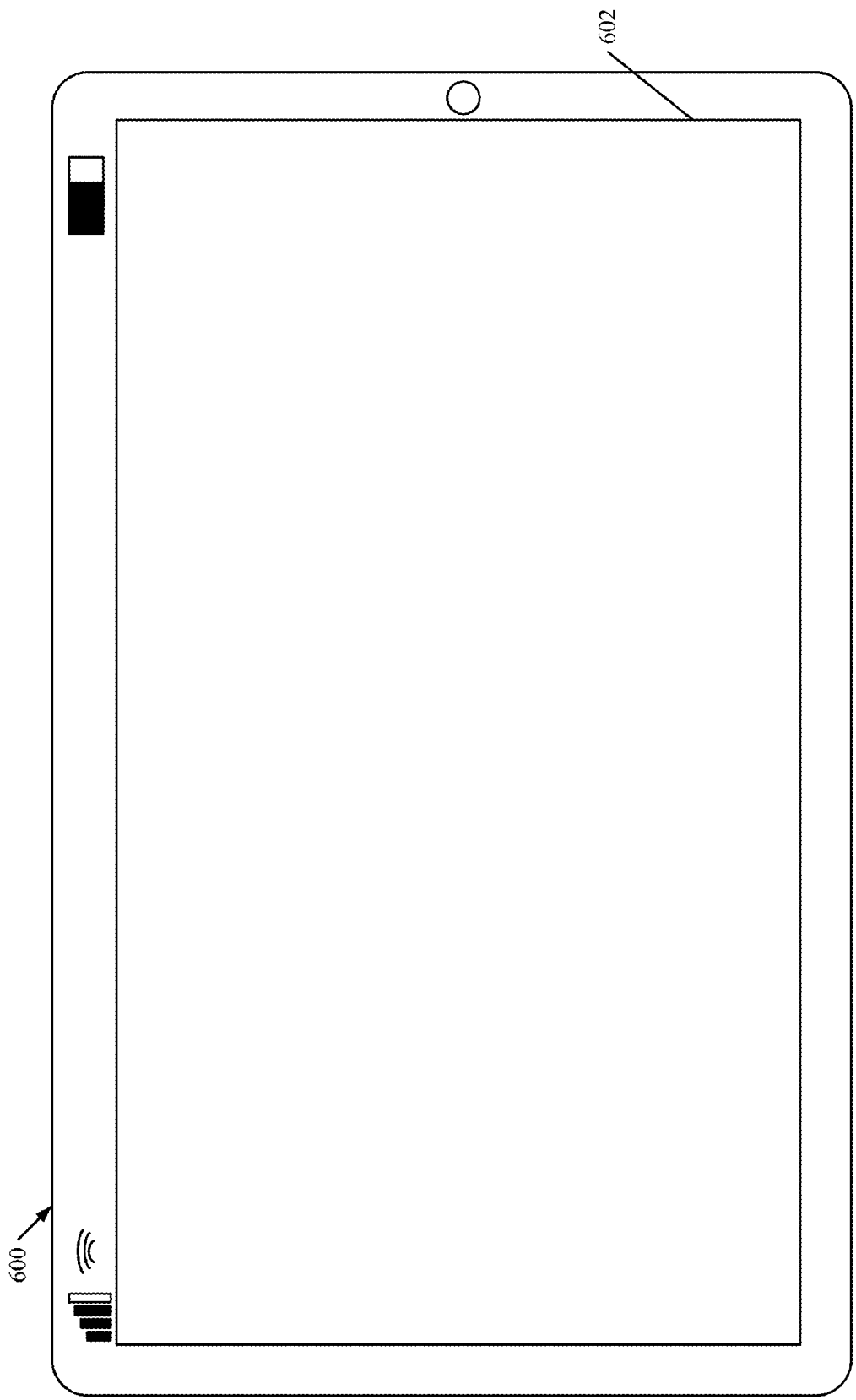

FIG. 9 shows one embodiment in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
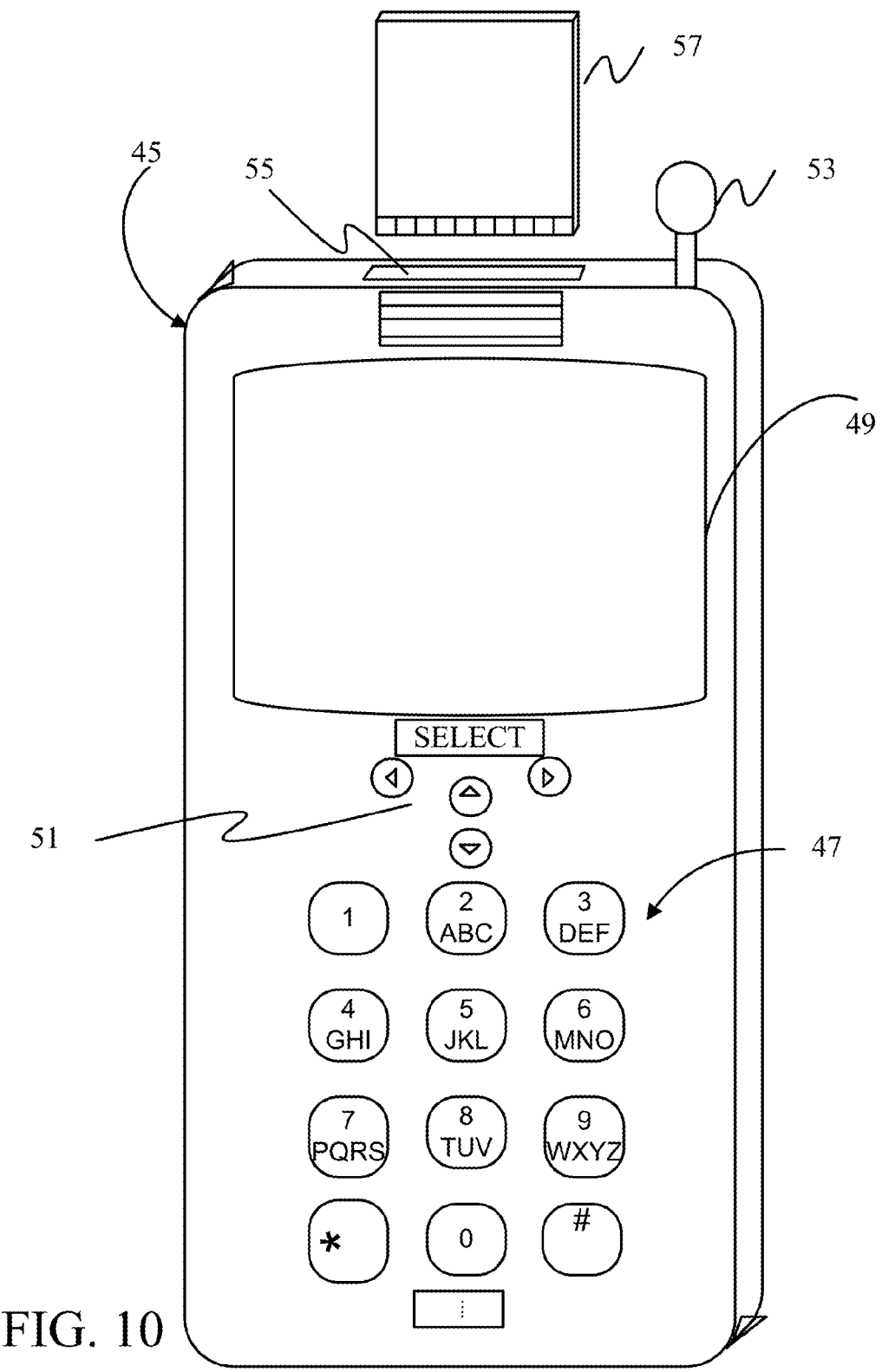
Figure 11:
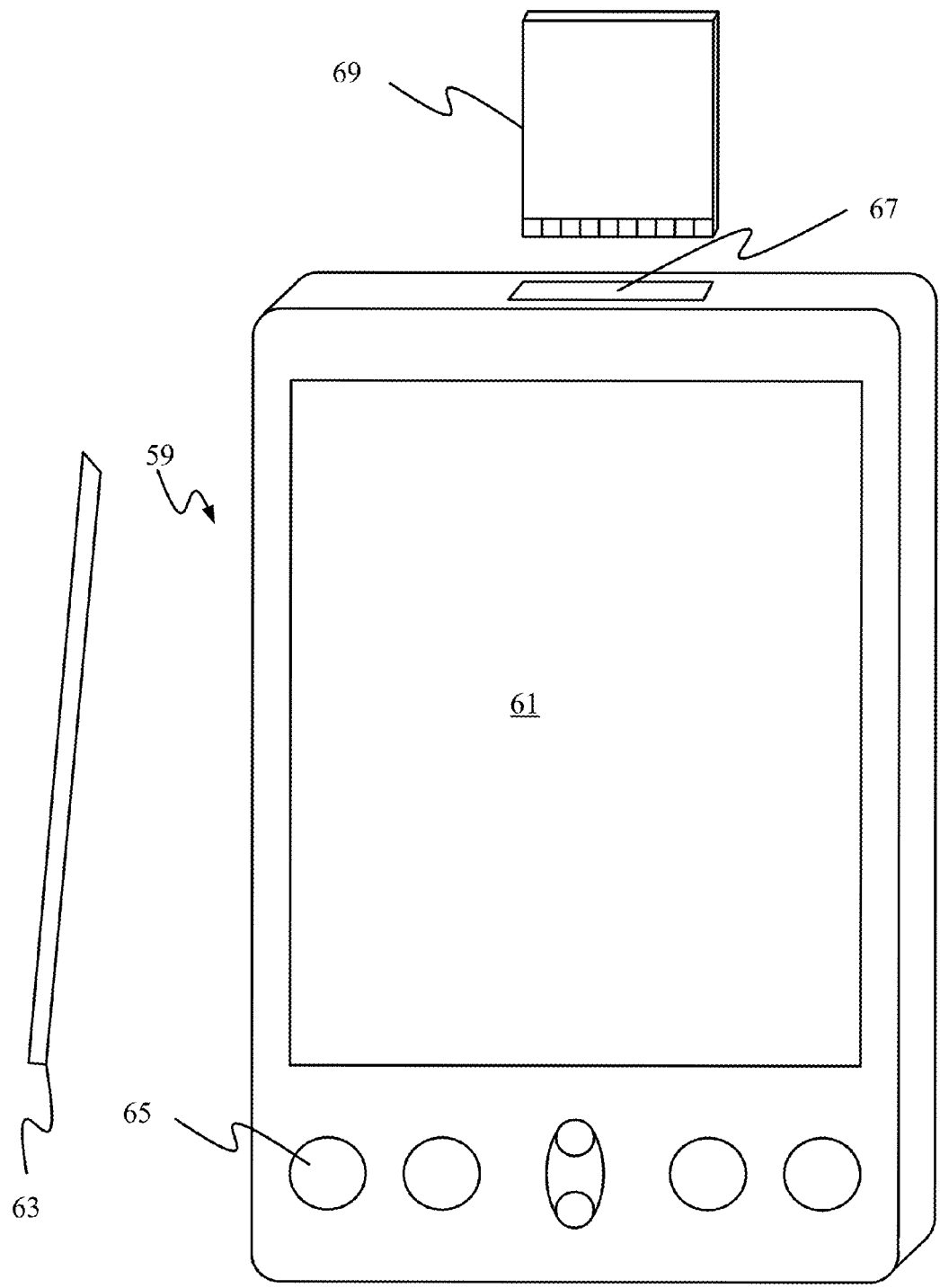

FIGS. 10 and 11 provide additional examples of devices 16 that can be used, although others can be used as well. In FIG. 10, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 12:
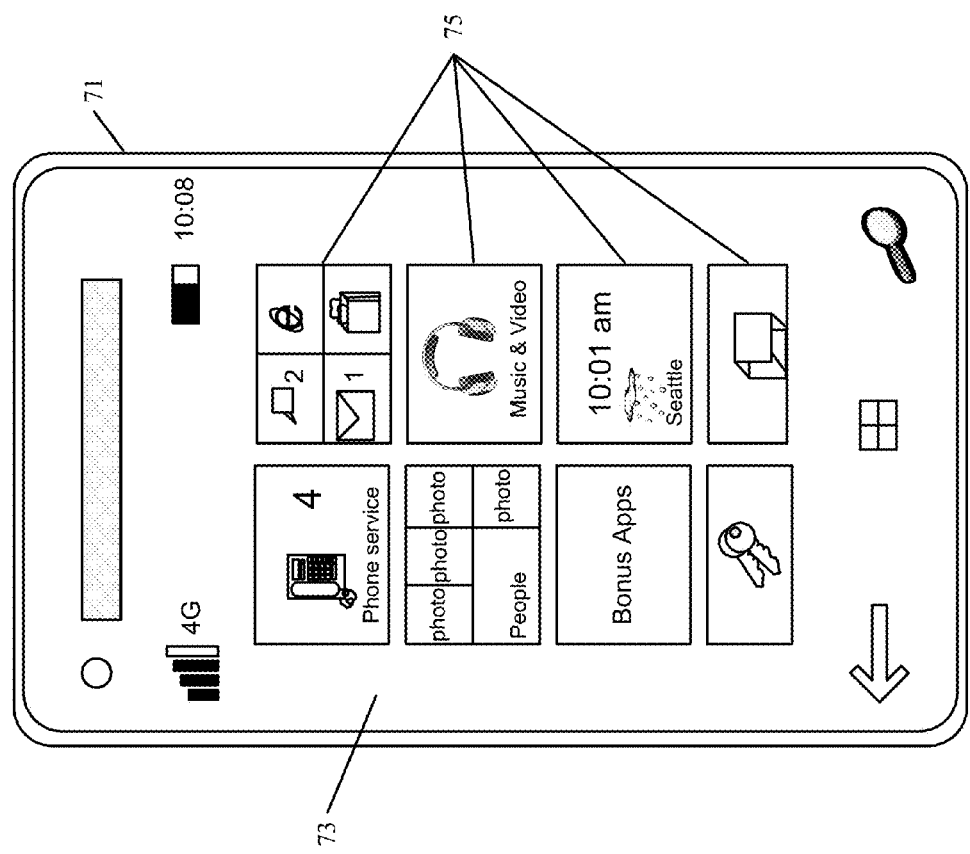

FIG. 12 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
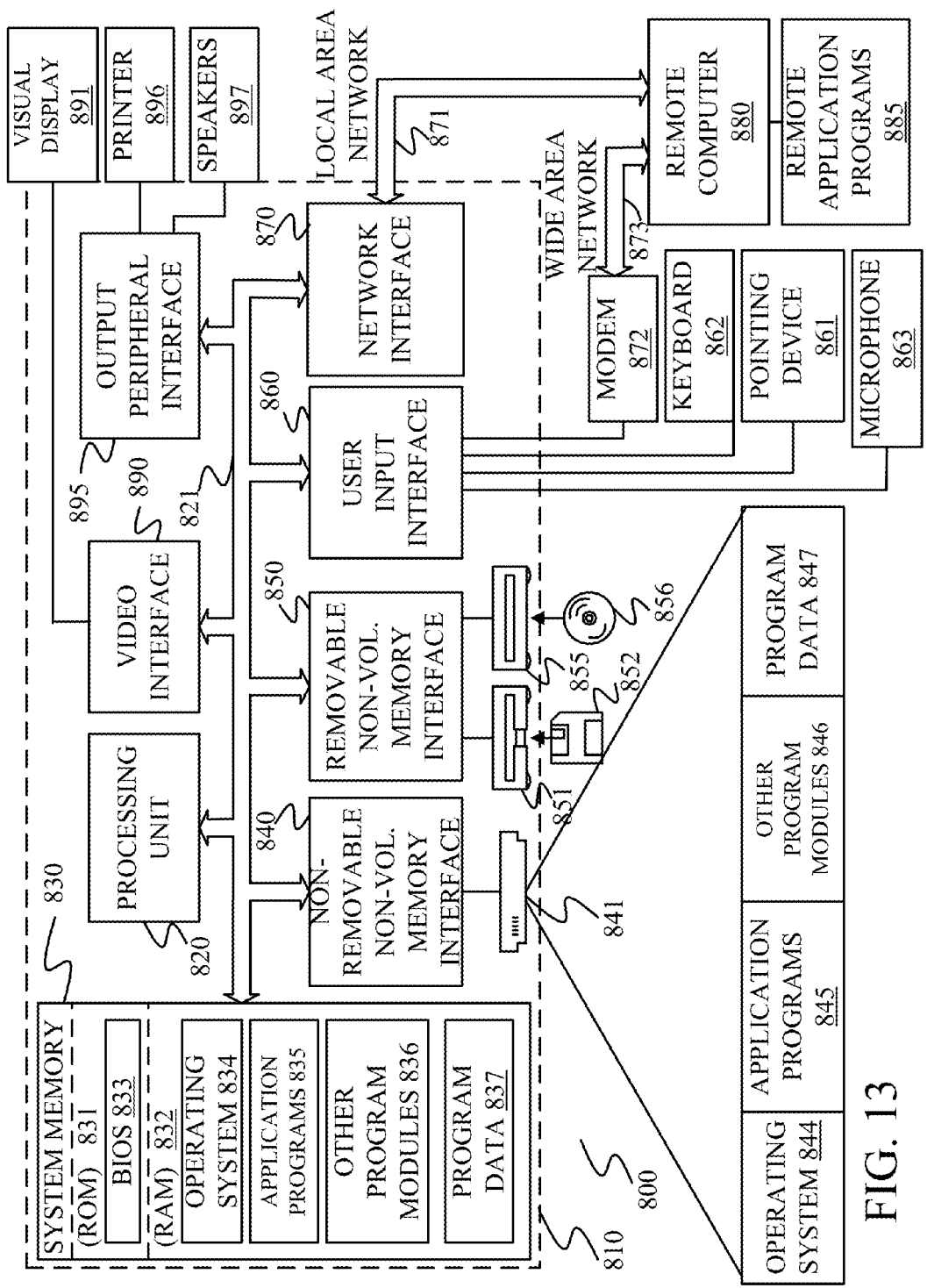
FIG. 13 is a block diagram of one illustrative computing environment.

FIG. 13 is one embodiment of a computing environment in which architecture 100, or parts of it, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise processor 122 or 148), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a pattern display component configured to display a hierarchical data structure that defines an arrangement of items on a user interface display, the hierarchical data structure having a set of nodes;

a pattern selection component configured to display a pattern selection user input mechanism that is actuated to select a pattern and obtain a selected pattern; and a validation system configured to validate a selected portion of the hierarchical data structure against the selected pattern to identify whether the hierarchical data structure conforms to the selected pattern.

Example 2 is the computing system of any or all previous examples wherein the pattern display component is configured to display the hierarchical data structure in an authored data display pane and to display the selected pattern in a pattern display pane.

Example 3 is the computing system of any or all previous examples and further comprising:

a hierarchical data generator component configured to receive user selection of a selected node in the set of nodes.

Example 4 is the computing system of any or all previous examples wherein the validation system comprises:

a pattern analyzer component configured to determine whether the selected node has any dependent nodes in the hierarchical structure and, if not, display a default pattern structure for the selected pattern, in the authored data display pane, when applied to the selected node.

Example 5 is the computing system of any or all previous examples wherein the pattern display component is configured to display a property generation pane that displays a set of properties, of the selected node, that are to be set in the selected pattern.

Example 6 is the computing system of any or all previous examples and further comprising:

a constraint system configured to identify properties, in the set of properties, that have given values in the selected pattern and to set the identified properties to the given values and remove the identified properties from the property generation pane.

Example 7 is the computing system of any or all previous examples wherein the constraint system is configured to identify sub-patterns, of the selected pattern, that are inapplicable in a context of the selected node and to remove the identified sub-patterns from the displayed default pattern structure.

Example 8 is the computing system of claim 6 wherein the selected node represents a control on the user interface display represented by the hierarchical structure and wherein the constraint system is configured to identify child controls, of the control represented by the selected node, that are inapplicable in a context of the selected node and to remove the identified child nodes from the displayed default pattern structure.

Example 9 is the computing system of any or all previous examples wherein the validation system further comprises:

a pattern conformance detection component configured to detect, for any dependent nodes from the selected node in the hierarchical structure, whether the dependent nodes conform to the selected pattern and, if not, identify errors in the dependent nodes.

Example 10 is the computing system of any or all previous examples wherein the pattern display component is configured to generate an error display indicative of the identified errors.

Example 11 is the computing system of any or all previous examples wherein the pattern display component is configured to generate the error display in an error display pane that displays a textual indication of the errors and to visually identify an erroneous dependent node in the selected pattern displayed in the pattern display pane.

Example 12 is the computing system of any or all previous examples wherein the pattern display component is configured to generate the error display with a link to an erroneous dependent node in the hierarchical structure that contains the identified error and to navigate the hierarchical structure displayed in the authored data pane to the erroneous node in response to actuation of the link.

Example 13 is the computing system of any or all previous examples wherein the pattern display component is configured to generate the error display with a remedial user input mechanism that is actuated to correct the error Example 14 is the computing system of any or all previous examples wherein, when the erroneous node is a missing dependent node, then the pattern display component is configured to generate the error display with an add user input mechanism proximate a display of the missing dependent node in the pattern display pane, the add user input mechanism being configured to, when actuated, add the missing dependent node to the hierarchical data structure displayed in the authored data display pane.

Example 15 is a method, comprising:

generating a set of user input mechanisms that are actuated to identify pattern definition user inputs;

receiving hierarchical control metadata, through the set of user input mechanisms, indicative of a pattern of hierarchically arranged controls on a user interface display;

receiving control property values, through the set of user input mechanisms, for properties of the hierarchically arranged controls;

receiving allowable sub-pattern metadata, through the set of user input mechanisms, indicative of allowed sub-patterns within the pattern of hierarchically arranged controls;

defining a user interface control pattern based on the hierarchical control metadata, the control property values, and the allowable sub-pattern metadata adding the user interface control pattern to a selection user input mechanism in a development environment for deployment to verify authored data in the development environment against the user interface control pattern.

Example 16 is the method of any or all previous examples and further comprising:

receiving control count metadata, through the set of user input mechanisms, indicative of an allowed control count in the user interface control pattern; and receiving dependent control multiplicity metadata, through the set of user input mechanisms, indicative of a number of allowed dependent controls in the user interface control pattern, and wherein defining the user interface control pattern comprises, defining the user interface control pattern based on the control count metadata and the dependent control multiplicity metadata.

Example 17 is a method, comprising:

displaying a hierarchical data structure that defines an arrangement of items on a user interface display, the hierarchical data structure having a set of nodes;

displaying a pattern selection user input mechanism that is actuated to select a pattern;

receiving a user selection input selecting a portion of the hierarchical data structure;

receiving user actuation of the selection user input mechanism, selecting a pattern;

validating the selected portion of the hierarchical data structure against the selected pattern to identify whether the hierarchical data structure conforms to the selected pattern; and displaying a validation result indicative of a result of the validation.

Example 18 is the method of any or all previous examples wherein displaying the hierarchical data structure comprises displaying the hierarchical data structure in an authored data display pane, wherein receiving user selection of a portion of the hierarchical structure comprises receiving user selection of a selected node in the set of nodes, and wherein validating comprises:

determining whether the selected node has any dependent nodes in the hierarchical data structure;

if not, displaying a default pattern structure for the selected pattern, in the authored data display pane, when applied to the selected node; and if so, detecting, for any dependent nodes from the selected node in the hierarchical data structure, whether the dependent nodes conform to the selected pattern and, if they do not conform, then identifying errors in the dependent nodes.

Example 19 is the method of any or all previous examples and, if the selected node has no dependent nodes, further comprising:

displaying a property generation pane that displays a set of properties, of the selected node, that are to be set in the selected pattern;

identifying properties, in the set of properties, that have given values in the selected pattern;

setting the identified properties to the given values; and removing the identified properties from the property generation pane.

Example 20 is the method of claim 19 and further comprising:

identifying sub-patterns, of the selected pattern, that are inapplicable in a context of the selected node;

removing the identified sub-patterns from the displayed default pattern structure;

identifying child controls, of a control represented by the selected node, that are inapplicable in a context of the selected node; and removing the identified child nodes from the displayed default pattern structure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions configure the computing system to:
generate a representation of a pattern display, the pattern display comprising:
a display pane configured to display a hierarchical data structure that represents items defining a user interface display, the hierarchical data structure having a set of hierarchically arranged nodes corresponding to the items;
a pattern selection user input mechanism; and
based on an indication of user actuation of the pattern selection user input mechanism, select a pattern representing a predefined, hierarchical arrangement of user interface items; and
validate a selected portion of the hierarchical data structure against the selected pattern; and
based on the validation, modify the representation of the pattern display to identify whether the hierarchical data structure, in the display pane, conforms to the selected pattern.

2. The computing system of claim 1 wherein the pattern display comprises an authoring user input mechanism, and the display pane comprises an authored data display pane, and wherein the instructions configure the computing system to:
based on an indication of user actuation of the authoring user input mechanism, author the hierarchical data structure in the authored data display pane; and
generate a pattern display pane that includes the selected pattern.

3. The computing system of claim 2 wherein the instructions configure the computing system:
receive an indication of user selection of a selected node in the set of hierarchically arranged nodes corresponding to the items; and
modify the representation of the pattern display to identify which nodes do not conform to the selected pattern.

4. The computing system of claim 3 wherein the instructions configure the computing system to:
determine whether the selected node has any dependent nodes in the hierarchical structure and, if not, generate a representation of a default pattern structure for the selected pattern, in the authored data display pane, when applied to the selected node.

5. The computing system of claim 4 wherein the instructions configure the computing system to:
generate a representation of a property generation pane that includes a set of properties, of the selected node, that are to be set in the selected pattern.

6. The computing system of claim 5 wherein the instructions configure the computing system to:
identify properties, in the set of properties, that have given values in the selected pattern, and to set the identified properties to the given values and remove the identified properties from the property generation pane.

7. The computing system of claim 6 wherein the instructions configure the computing system to:
identify sub-patterns, of the selected pattern, that are inapplicable in a context of the selected node and to remove the identified sub-patterns from the displayed default pattern structure.

8. The computing system of claim 6 wherein the selected node represents a control on the user interface display represented by the hierarchical structure and wherein the instructions configure the computing system to:
identify child controls, of the control represented by the selected node, that are inapplicable in a context of the selected node and to remove the identified child nodes from the displayed default pattern structure.

9. The computing system of claim 5 wherein the instructions configure the computing system to:
detect, for any dependent nodes from the selected node in the hierarchical structure, whether the dependent nodes conform to the selected pattern and, if not, identify errors in the dependent nodes.

10. The computing system of claim 9 wherein the instructions configure the computing system to:
generate a representation of an error display indicative of the identified errors.

11. The computing system of claim 10 wherein the instructions configure the computing system to:
generate the representation of the error display in an error display pane that displays a textual indication of the errors and visually identifies an erroneous dependent node in the selected pattern displayed in the pattern display pane.

12. The computing system of claim 11 wherein the instructions configure the computing system to:
generate the representation of the error display with a link to an erroneous dependent node in the hierarchical structure that contains the identified error and to navigate the hierarchical structure displayed in the authored data pane to the erroneous node in response to actuation of the link.

13. The computing system of claim 12 wherein the instructions configure the computing system to:
generate the representation of the error display with a remedial user input mechanism, and
based on an indication of user actuation of the remedial user input mechanism, perform an action in the computing system to correct the error.

14. The computing system of claim 13 wherein, when the erroneous node is a missing dependent node, then the instructions configure the computing system to:
generate the representation of the error display with an add user input mechanism proximate the missing dependent node in the pattern display pane; and
based on an indication of user actuation of the add user input mechanism, add the missing dependent node to the hierarchical data structure in the authored data display pane.

15. A method, comprising:
generating a set of user input mechanisms configured to receive an indication of pattern definition user inputs;
receiving hierarchical control metadata, through the set of user input mechanisms, indicative of a pattern of hierarchically arranged controls on a user interface display;
receiving control property values, through the set of user input mechanisms, for properties of the hierarchically arranged controls;
receiving allowable sub-pattern metadata, through the set of user input mechanisms, indicative of allowed sub-patterns within the pattern of hierarchically arranged controls;
defining a user interface control pattern based on the hierarchical control metadata, the control property values, and the allowable sub-pattern metadata
adding the user interface control pattern to a selection user input mechanism in a development environment for deployment to verify authored data in the development environment against the user interface control pattern.

16. The method of claim 15 and further comprising:
receiving control count metadata, through the set of user input mechanisms, indicative of an allowed control count in the user interface control pattern; and
receiving dependent control multiplicity metadata, through the set of user input mechanisms, indicative of a number of allowed dependent controls in the user interface control pattern, and wherein defining the user interface control pattern comprises, defining the user interface control pattern based on the control count metadata and the dependent control multiplicity metadata.

17. A computer-implemented method, comprising:
generating a representation of a first user interface display having an authored data display pane and a pattern selection user input mechanism, the authored data display pane comprising a hierarchical data structure that defines an arrangement of items on a second user interface display, the hierarchical data structure having a set of nodes;
based on an indication of a user selection input selecting a node in the set of nodes of the hierarchical data structure;
based on an indication of user actuation of the pattern selection user input mechanism, selecting a pattern;
validating the selected portion of the hierarchical data structure against the selected pattern to identify whether the hierarchical data structure conforms to the selected pattern, wherein validating comprises:
determining whether the selected node has any dependent nodes in the hierarchical data structure;
if the selected node does not have any dependent nodes, modifying the representation of the first user interface display to include a default pattern structure for the selected pattern, in the authored data display pane, when applied to the selected node; and
if the selected node does have a dependent node, detecting whether the dependent node conforms to the selected pattern and, if the dependent node does not conform, then identifying an error in the dependent node; and
modifying the representation of the first user interface display to include a validation result indicative of a result of the validation.

18. The method of claim 17 and, if the selected node has no dependent nodes, further comprising:
generating a representation of a property generation pane that includes a set of properties, of the selected node, that are to be set in the selected pattern;
identifying properties, in the set of properties, that have given values in the selected pattern;
setting the identified properties to the given values; and
removing the identified properties from the property generation pane.

19. The method of claim 18 and further comprising:
identifying sub-patterns, of the selected pattern, that are inapplicable in a context of the selected node;
removing the identified sub-patterns from the displayed default pattern structure;
identifying child controls, of a control represented by the selected node, that are inapplicable in a context of the selected node; and
removing the identified child nodes from the displayed default pattern structure.

* * * * *